(12) United States Patent
Maeda et al.

(10) Patent No.: US 6,598,224 B1
(45) Date of Patent: Jul. 22, 2003

(54) DATA MANAGEMENT UNIT, COMPUTER SYSTEM AND COMPUTER-READABLE STORAGE MEDIUM

(75) Inventors: Takeshi Maeda, Tokyo (JP); Yutaka Sakai, Tokyo (JP); Yoshihiro Koizumi, Tokyo (JP); Tatsuji Tanaka, Saitama-Ken (JP); Katsuhiko Sekiguchi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/560,742

(22) Filed: Apr. 28, 2000

(30) Foreign Application Priority Data

Apr. 30, 1999 (JP) .......................................... 11-124923

(51) Int. Cl.[7] .............................................. G06F 9/445
(52) U.S. Cl. ...................... 717/174; 717/120; 717/168; 717/176; 717/178; 707/102; 707/101; 707/100
(58) Field of Search ................................ 717/176–178, 717/120, 168, 174; 707/102, 101, 100; 711/154

(56) References Cited

U.S. PATENT DOCUMENTS

| | | | | |
|---|---|---|---|---|
| 5,666,527 A | * | 9/1997 | Tatsumi et al. | 707/101 |
| 5,926,089 A | | 7/1999 | Sekiguchi et al. | 340/500 |
| 6,085,036 A | * | 7/2000 | Bandat | 717/120 |
| 6,088,697 A | * | 7/2000 | Crockett et al. | 707/10 |
| 6,285,917 B1 | * | 9/2001 | Sekiguchi et al. | 700/239 |

FOREIGN PATENT DOCUMENTS

| | | |
|---|---|---|
| JP | 2000-163122 | 6/2000 |
| WO | WO 9961969 A2 * | 12/1999 |

OTHER PUBLICATIONS

K. Sekiguchi et al., "NC Relay: Protection and Control System Applying Internet Technology–Concept.", National Convention Record Information I.E.E. Japan, pp. 6–462–464, 1999.

K. Sekiguchi et al., "Power System Protection and Control System Applying Intranet Technology.", Toshiba Review, vol. 54, No. 6, pp. 34–50, 1999.

* cited by examiner

Primary Examiner—Hong Kim
(74) Attorney, Agent, or Firm—Foley & Lardner

(57) ABSTRACT

In a data management unit in a computer system, the computer system has a computer in which the data management unit is incorporated, and a terminal intercommunicates with the computer. In the data management unit, an object data storage unit (memory) stores in addresses thereon data items to which the terminal is adapted to make access. A parameter management file stores thereon parameters concerning a data structure of each data item. The parameters include a data name of each data item, a data type of each data item, an address related to each data item on the data storage unit and an array information of at least one data item. Then at least one data item has an array structure, and the array information includes a number of the array elements. On a number of bytes definition table, a number of bytes corresponding to each data type of each data item is stored. A data table producing module is adapted to make, according to the parameters concerning the data structures of the data items of the numbers of bytes of the data types, an address related to each data item in array element units on the memory (data storage unit) correspond to each data name of each data item so as to produce a data table.

20 Claims, 34 Drawing Sheets

| DATA TYPE | DATA NAME | NUMBER OF ARRAY DIMENSIONS | NUMBER OF ARRAY ELEMENTS | ADDRESS | |
|---|---|---|---|---|---|
| int | max | 0 | 0 | a0000000 | ～D1(0) |
| int | min | 0 | 0 | a0000004 | ～D1(1) |
| int | data1 | 1 | 16 | a0000008 | ～D1(2) |
| char | Data2 | 0 | 0 | a0000048 | ～D1(3) |
| ⋮ | ⋮ | ⋮ | ⋮ | ⋮ | |

| DATA TYPE | NUMBER OF BYTES |
|---|---|
| Int | 4 |
| Short | 2 |
| Long | 8 |
| Char | 2 |
| ⋮ | ⋮ |

| DATA NUMBER | DATA TYPE | DATA NAME | NUMBER OF ARRAY DIMENSIONS | NUMBER OF ARRAY ELEMENTS | ADDRESS | |
|---|---|---|---|---|---|---|
| 0 | int | max | 0 | 0 | a0000000 | 14 — D1(0) |
| 1 | int | min | 0 | 0 | a0000004 | D1(1) |
| 2 | int | data1 | 1 | 0 | a0000008 | |
| 2 | int | data1 | 1 | 1 | a000000c | |
| 2 | int | data1 | 1 | 2 | a0000010 | D1(2) |
| ⋮ | ⋮ | ⋮ | ⋮ | ⋮ | ⋮ | |
| 3 | char | data2 | 0 | 0 | a0000048 | D1(3) |
| ⋮ | ⋮ | ⋮ | ⋮ | ⋮ | ⋮ | |

FIG. 6

| DATA TYPE | DATA NAME | NUMBER OF ARRAY DIMENSIONS | NUMBER OF ARRAY ELEMENTS | ADDRESS |
|---|---|---|---|---|
| STRUCTURE | kouzou1 | 0 | 0 | a0000000 |
| int | max | 0 | 0 | a0000000 |
| int | min | 0 | 0 | a0000004 |
| int | data1 | 1 | 16 | a0000008 |
| char | data2 | 0 | 0 | a0000048 |
| ⋮ | ⋮ | ⋮ | ⋮ | ⋮ |
| STRUCTURE | kouzou2 | 0 | 0 | a0000100 |
| int | default | 0 | 0 | a0000100 |
| ⋮ | ⋮ | ⋮ | ⋮ | ⋮ |

| STRUCTURE NUMBER | STRUCTURE NAME | NUMBER OF ARRAY DIMENSIONS | NUMBER OF ARRAY ELEMENTS | ADDRESS |
|---|---|---|---|---|
| 0 | kouzou1 | 0 | 0 | a0000000 |
| 1 | Kouzou2 | 0 | 0 | a0000100 |
| ⋮ | ⋮ | ⋮ | ⋮ | ⋮ |

| STRUCTURE NUMBER | STRUCTURE NAME | DATA TYPE | DATA NAME | NUMBER OF ARRAY DIMENSIONS | NUMBER OF ARRAY ELEMENTS | ADDRESS |
|---|---|---|---|---|---|---|
| 0 | 0 | int | max | 0 | 0 | a0000000 |
| 0 | 1 | int | min | 0 | 0 | a0000004 |
| 0 | 2 | int | data1 | 1 | 0 | a0000008 |
| 0 | 2 | int | data1 | 1 | 1 | a000000c |
| 0 | 2 | int | data1 | 1 | 2 | a0000010 |
| ⋮ | ⋮ | ⋮ | ⋮ | ⋮ | ⋮ | ⋮ |
| 0 | 3 | char | data2 | 0 | 0 | a0000048 |
| ⋮ | ⋮ | ⋮ | ⋮ | ⋮ | ⋮ | ⋮ |
| 1 | 0 | int | default | 0 | 0 | a0000100 |
| ⋮ | ⋮ | ⋮ | ⋮ | ⋮ | ⋮ | ⋮ |

FIG. 14

| DATA TYPE | DATA NAME | NUMBER OF ARRAY DIMENSIONS | NUMBER OF ARRAY ELEMENTS | ADDRESS |
|---|---|---|---|---|
| STRUCTURE | kouzou1 | 0 | 0 | a0000000 |
| int | max | 0 | 0 | |
| int | min | 0 | 0 | |
| int | data1 | 1 | 16 | |
| char | data2 | 0 | 0 | |
| ⋮ | ⋮ | ⋮ | ⋮ | ⋮ |
| STRUCTURE | kouzou2 | 0 | 0 | a0000100 |
| int | default | 0 | 0 | |
| ⋮ | ⋮ | ⋮ | ⋮ | ⋮ |

| STRUCTURE NUMBER | STRUCTURE NAME | NUMBER OF ARRAY DIMENSIONS | NUMBER OF ARRAY ELEMENTS | ADDRESS |
|---|---|---|---|---|
| 0 | kouzou1 | 0 | 0 | a0000000 |
| 1 | kouzou2 | 0 | 0 | a0000100 |
| ⋮ | ⋮ | ⋮ | ⋮ | ⋮ |

FIG. 16

| STRUCTURE NUMBER | STRUCTURE NAME | DATA TYPE | DATA NAME | NUMBER OF ARRAY DIMENSIONS | NUMBER OF ARRAY ELEMENTS | ADDRESS |
|---|---|---|---|---|---|---|
| 0 | 0 | int | max | 0 | 0 | a0000000 |
| 0 | 1 | int | min | 0 | 0 | a0000004 |
| 0 | 2 | int | data1 | 1 | 0 | a0000008 |
| 0 | 2 | int | data1 | 1 | 1 | a000000c |
| 0 | 2 | int | data1 | 1 | 2 | a0000010 |
| ⋮ | ⋮ | ⋮ | ⋮ | ⋮ | ⋮ | ⋮ |
| 0 | 3 | char | data2 | 0 | 0 | a0000048 |
| ⋮ | ⋮ | ⋮ | ⋮ | ⋮ | ⋮ | ⋮ |
| 1 | 0 | int | default | 0 | 0 | a0000100 |
| ⋮ | ⋮ | ⋮ | ⋮ | ⋮ | ⋮ | ⋮ |

| STRUCTURE NUMBER | STRUCTURE NAME | DATA TYPE | DATA NAME | NUMBER OF ARRAY DIMENSIONS | NUMBER OF ARRAY ELEMENTS | OFFSET VALUE |
|---|---|---|---|---|---|---|
| 0 | 0 | int | max | 0 | 0 | 0 |
| 0 | 1 | int | min | 0 | 0 | 4 |
| 0 | 2 | int | data1 | 1 | 0 | 8 |
| 0 | 2 | int | data1 | 1 | 1 | c |
| 0 | 2 | int | data1 | 1 | 2 | 10 |
| ⋮ | ⋮ | ⋮ | ⋮ | ⋮ | ⋮ | ⋮ |
| 0 | 3 | char | data2 | 0 | 0 | 48 |
| ⋮ | ⋮ | ⋮ | ⋮ | ⋮ | ⋮ | ⋮ |
| 1 | 0 | int | default | 0 | 0 | 0 |
| ⋮ | ⋮ | ⋮ | ⋮ | ⋮ | ⋮ | ⋮ |

| DATA TYPE | DATA NAME | NUMBER OF ARRAY DIMENSIONS | NUMBER OF ARRAY ELEMENTS | ADDRESS |
|---|---|---|---|---|
| STRUCTURE | kouzou1 | 0 | 0 | a0000000 |
| int | max | 0 | 0 | |
| int | min | 0 | 0 | |
| int | data1 | 1 | 16 | |
| char | data2 | 0 | 0 | |
| ⋮ | ⋮ | ⋮ | ⋮ | ⋮ |
| STRUCTURE | kouzou2 | 0 | 0 | a0000100 |
| int | default | 0 | 0 | |
| ⋮ | ⋮ | ⋮ | ⋮ | ⋮ |
| STRUCTURE | kouzou3 | 0 | 0 | /usr/tmp |
| float | tmpdata1 | 0 | 0 | |
| ⋮ | ⋮ | ⋮ | ⋮ | ⋮ |

| STRUCTURE NUMBER | STRUCTURE NAME | DATA TYPE | DATA NAME | NUMBER OF ARRAY DIMENSIONS | NUMBER OF ARRAY ELEMENTS | ADDRESS |
|---|---|---|---|---|---|---|
| 0 | 0 | int | max | 0 | 0 | a0000000 |
| 0 | 1 | int | min | 0 | 0 | a0000004 |
| 0 | 2 | int | data1 | 1 | 0 | a0000008 |
| 0 | 2 | int | data1 | 1 | 1 | a000000c |
| 0 | 2 | int | data1 | 1 | 2 | a0000010 |
| ⋮ | ⋮ | ⋮ | ⋮ | ⋮ | ⋮ | ⋮ |
| 0 | 3 | char | data2 | 0 | 0 | a0000048 |
| ⋮ | ⋮ | ⋮ | ⋮ | ⋮ | ⋮ | ⋮ |
| 1 | 0 | int | default | 0 | 0 | a0000100 |
| ⋮ | ⋮ | ⋮ | ⋮ | ⋮ | ⋮ | ⋮ |
| 2 | 0 | float | tmpdata1 | 0 | 0 | /usr/tmp |
| ⋮ | ⋮ | ⋮ | ⋮ | ⋮ | ⋮ | ⋮ |

| DATA TYPE | DATA NAME | NUMBER OF ARRAY DIMENSIONS | NUMBER OF ARRAY ELEMENTS | ADDRESS | WHETHER OR NOT READING PERMITTED |
|---|---|---|---|---|---|
| STRUCTURE | kouzou1 | 0 | 0 | a0000000 | r |
| int | max | 0 | 0 | | |
| int | min | 0 | 0 | | |
| int | data1 | 1 | 16 | | |
| char | data2 | 0 | 0 | | |
| ⋮ | ⋮ | ⋮ | ⋮ | ⋮ | |
| STRUCTURE | kouzou2 | 0 | 0 | a0000100 | rw |
| int | default | 0 | 0 | | |
| ⋮ | ⋮ | ⋮ | ⋮ | ⋮ | |
| STRUCTURE | kouzou3 | 0 | 0 | /usr/tmp | rw |
| float | tmpdata1 | 0 | 0 | | |
| ⋮ | ⋮ | ⋮ | ⋮ | ⋮ | |

| STRUCTURE NUMBER | STRUCTURE NAME | NUMBER OF ARRAY DIMENSIONS | NUMBER OF ARRAY ELEMENTS | ADDRESS | WHETHER OR NOT READING PERMITTED |
|---|---|---|---|---|---|
| 0 | kouzou1 | 0 | 0 | a0000000 | r |
| 1 | kouzou2 | 0 | 0 | a0000100 | rw |
| 2 | kouzou3 | 0 | 0 | /usr/tmp | rw |
| ⋮ | ⋮ | ⋮ | ⋮ | ⋮ | ⋮ |

| STRUCTURE NUMBER | STRUCTURE NAME | DATA TYPE | DATA NAME | NUMBER OF ARRAY DIMENSIONS | NUMBER OF ARRAY ELEMENTS | ADDRESS | WHETHER OR NOT READING PERMITTED |
|---|---|---|---|---|---|---|---|
| 0 | 0 | int | max | 0 | 0 | a0000000 | r |
| 0 | 1 | int | min | 0 | 0 | a0000004 | r |
| 0 | 2 | int | data1 | 1 | 0 | a0000008 | r |
| 0 | 2 | int | data1 | 1 | 1 | a000000c | r |
| 0 | 2 | int | data1 | 1 | 2 | a0000010 | r |
| ... | ... | ... | ... | ... | ... | ... | r ... |
| 0 | 3 | char | data2 | 0 | 0 | a0000048 | r |
| ... | ... | ... | ... | ... | ... | ... | r ... |
| 1 | 0 | int | default | 0 | 0 | a0000100 | rw |
| ... | ... | ... | ... | ... | ... | ... | rw ... |
| 2 | 0 | float | tmpdata1 | 0 | 0 | /usr/tmp | rw |
| ... | ... | ... | ... | ... | ... | ... | rw ... |

```
                                              20A
           ┌─────────────────────────┐
           │ " dm = RelayReference ";│
           │    group = " DEP1-DIV1 ";│
           └─────────────────────────┘
```

FIG. 39

```
                                                          70
 ┌──────────────────────────────────────────────────────────┐
 │ dn: cn=DEP1-DIV1, ou=DEP1, ou=DIV1, o=toshiba.co.jp       │
 │ cn: DEP1-DIV1                                             │
 │ uniquemember: uid=tanaka, ou=DEP1, ou=DIV1, o=toshiba.co.jp│
 │ uniquemember: uid=Suzuki, ou=DEP1, ou=DIV1, o=toshiba.co.jp│
 └──────────────────────────────────────────────────────────┘
```

FIG. 40

```
" dm = RelayReference.getValue ";
    group = " DEP1-DIV1 ";
```

DATA MANAGEMENT UNIT, COMPUTER SYSTEM AND COMPUTER-READABLE STORAGE MEDIUM

BACKGROUND OF THE INVENTION

1. Field of the Invention

The present invention relates to an installed type of data management unit, a computer system and a computer-readable storage medium, which permit at least one terminal to obtain data stored on a predetermined computer in the computer system, such as a supervisory control system for supervising and controlling an equipment device related to electric power, gas or water service, an information processing system and so on, and to set data to the computer.

2. Description of the Related Art

FIG. 45 shows the schematic structure of a conventional supervisory control system for supervising and controlling a plurality of equipment devices concerning electric power, gas or water service.

In a supervisory control system shown in FIG. 45, real time data (real time state data) indicating the real states of equipment devices (objects) S1, S2, . . . (two equipment devices in the structure shown in FIG. 45) which are objects for supervisory control is transmitted to a control computer 101 through a private (leased) network 100. Receiving and accumulating processes are performed by a database access process unit (module) 102 of the control computer 101 in accordance with a data access (operation) program 103 stored on the database access process unit 102. Thus, the real time state data (for example, data 1 and data 2 in FIG. 45) are stored on a database 104 of the control computer 101.

In the conventional supervisory control system, the control computer 101 and a group of terminals 105a1, 105a2, . . . , (two terminals in the structure shown in FIG. 45) arranged, for example, remotely with respect to the control computer 101 are connected to each other through the private network 100 such that data communication is permitted. The terminals 105a1, 105a2, . . . , are operated to make access to the database 104 through the processing unit 102 of the control computer 101 so as to read the state data of the equipment devices S1, S2, . . . , as the objects for supervisory control from the database 104. In accordance with read state data, the states of the respective units S1, S2, . . . , are supervised and controlled by the terminals 105a1, 105a2, . . . .

The control computer 101 of the conventional supervisory control system is a special computer for only the object to be supervised and controlled. The structures (the data type and array information and the like) of the state data which are stored on the database 104 and data description languages thereof vary according to the corresponding objects to be supervised an controlled, but the structures of the state data themselves are rarely changed. Therefore, in the conventional system, addresses are fixedly allocated to the plurality of state data of the plurality of objects to be supervised and controlled so that the processing unit 102 of the control computer 101 is operative to store the received state data in the corresponding allocated addresses of the database 104.

Moreover, the terminals 105a1, 105a2, . . . , are operated to specify the address allocated to the state data so as to make access to the state data in the database 104.

In addition, to permit the processing unit 102 to operate the state data having different data structures, the data access programs (software modules) installed on the computer 101 are made to be discrete for every objects to be supervised and controlled.

As described above, in view of the fact that a data structure of state data of an object to be supervised and controlled is not frequently changed, the control computer of the conventional supervisory control system is operative to store the data on the database by using the method of fixedly allocating the address to the data.

However, in recent years, as substitute for the foregoing method of allocating a fixedly address to data having unchanged data structure, it is desirable to flexibly change the data structure and the address of data according to kind and state of the object to be supervised and controlled.

On the contrary, in order to correspond to the change of the data structure and the address of the data in the control computer, the data access program must be changed because the data access program (the software module) is made to be related to the data structure and the address of the data, so that it is hard to flexibly correspond to the change of the data structure and the address of the data.

Especially, in recent years, wide use of a distributed processing system results in special control computer being provided for each object to be supervised and controlled. To make the control computer general-purpose, that is, to supervise and control the object (equipment device) using different compute hardware, it must be demanded to standard the data access programs (software modules) installed on the general control computers so as to supervise and control a variety of objects by one type of standard program (software module).

In order to install the standard data access program (software module) on each control computer, it is required to permit each control computer to access, in accordance with the standard data access program, state data of various objects for supervisory control, which have different data structures and data description languages.

However, the standard data access program must include a program for converting the data structure or state data described in a data description language different from the software language in which the standard data access program is described, causing the structure of the standard data access program and the process performed by the computer in accordance with the standard access program to be complicated thereby preventing the control computer from being generalized.

SUMMARY OF THE INVENTION

The present invention is directed to overcome the foregoing problems and foregoing circumstances.

Accordingly, it is an object of the present invention is to provide a data management unit, a computer system and a computer-readable storage medium, which enable a computer to flexibly correspond to the change in the data structure, the change of the data description language and the change of the address of each object to be supervised and controlled.

Moreover, it is another object of the present invention is to provide a data management unit, a computer system and a computer-readable storage medium, which allow a general computer to make access to state data of various objects for supervisory control, which have different data structures and data description languages.

Furthermore, it is further object of the present invention is to provide a data management unit, a computer system and a computer-readable storage medium, which are capable of easily accessing state data by using a data access program (software module) described in a software language which is different from a data description language of the state data without executing a data-structure converting process.

In order to achieved such objects, according to one aspect of the present invention, there is provided a data management unit in a computer system, the computer system having a computer in which the data management unit is incorporated, and a terminal intercommunicating with the computer, the data management unit comprising: first storage means having a memory for storing, in addresses on the memory, data items to which the terminal is adapted to make access; second storage means for storing thereon parameters concerning a data structure of each data item, the parameters including a data name of each data item, a data type of each data item, an address related to each data item on the memory and an array information of at least one data item, the at least one data item having an array structure, the array information including a number of the array elements; third storage means for storing thereon a number of bytes corresponding to each data type of each data item; and producing means for making, according to the parameters concerning the data structures of the data items and the numbers of bytes of the data types, an address related to each data item in array element units on the memory correspond to each data name of each data item so as to produce a data table.

In preferred embodiment of this aspect, the producing means comprises: means for reading each top address related to each data item on the memory, each data type thereof and the array information of the at least one of the data items from the second storage means, respectively; means for reading each number of bytes corresponding to each data type from the third storage means; means for calculating each top address related to each data item for each array element according to each address, each data type, the array information and each number of bytes, which are read from the second and third storage means; and means for making each top address related to each data item in array element units correspond to each data name of each data item so as to produce the data table.

In preferred embodiment of this aspect, a data management unit further comprises obtaining means for retrieving the data table according to a data name transmitted from the terminal so as to obtain at least one address corresponding to the transmitted data name, thereby returning at least one data item stored in the at least one address on the memory to the terminal.

The preferred embodiment of this aspect has an arrangement of further comprising writing means for retrieving the data table in accordance with a data name and a data value corresponding thereto so as to obtain at least one address corresponding to the data name, thereby writing the data value into the at least one obtained address on the memory, the data name and data value being transmitted from the terminal.

In preferred embodiment of this aspect, the data items include a structure having structural data elements, the second storage means stores thereon structure parameters concerning the data structure of each structural data element of the structure, the structure parameters including a data name of each structural data element, a data type of each structural data element, an address related to each structural data element on the memory and an array information of at least one of the structural data elements, the array information including a number of array elements; and wherein the producing means includes means for making, according to the structural parameters concerning the data structure of the data items and the numbers of bytes of the data types, an address related to each structural data element in array element units on the memory correspond to each data name of each structural data element so as to produce the data table.

The preferred embodiment of this aspect has an arrangement that the structure consists of structures each having structural data elements, the second storage means stores thereon a top address of each structure as an address related to each data item on the memory, and wherein the producing means is adapted to obtain each address of each structural data element of each structure in array element units according to each top address of each structure, each number of bytes of each structural data element and the array information so as to make each obtained address of each structural data element in array element units correspond to each name of each structural data element so as to produce the data table.

In preferred embodiment of this aspect, the structure consists of structures each having structural data elements, the second storage means stores thereon a top address of each structure as an address related to each data item on the memory, and wherein the producing means comprises means adapted to obtain each offset value of each structural data element of each structure according to each top address of each structure, each number of bytes of each structural data element and the array information, the each offset value of each structural data element representing each distance between each top address of each structure and each structural data element; and means adapted to make each obtained offset value of each structural data element correspond to each name of each structural data element so as to produce the data table.

The preferred embodiment of this aspect has an arrangement that the computer comprises an auxiliary memory, the first storage means comprises means for storing, in addresses on the memory, one part of the data items and for storing another part thereof in directories in the auxiliary memory, the second storage means stores the directories in which the another part of the data items are stored in place of the addresses related to another part of the data items, and wherein the producing means is adapted to make, according to the parameters including the directories and concerning the data structures of the data items and the numbers of bytes of the data types, addresses of one part of the data items and directories of another part thereof in array element units correspond to the data names of the data items, respectively, so to produce the data table.

In order to achieve such objects, according to another aspect of the previous invention, there is provided a data management unit in a computer system, the computer system having a computer in which the data management unit is incorporated, and a terminal intercommunicating with the computer, the data management unit comprising: first storage means having a memory for storing, in addresses on the memory, data items to which the terminal is adapted to make access; second storage means for storing thereon parameters concerning a data structure of each data item, the parameters including a data name of each data item, a data type of each data item, an address related to each data item on the memory and an array information of at least one data item, the at least one data item having an array structure, the array information including a number of array elements; third storage means for storing thereon a number of bytes corresponding to each data type of each data item; and producing means for making, according to the parameters concerning the data structures of the data items and the numbers of bytes of the data types, an address related to each data item in array element units on the memory correspond to each data name of each data item so as to produce a data table; access means for retrieving the data table according to a message transmitted from the terminal so as to be capable of making access to the memory based on the retrieved result, the message including an user ID; means for registering at least one user ID that at least one user has, the at least one user being permitted to make access to the data; means for determining whether or not the at least one registered user ID in the registering means and the user ID from the terminal coincide with each other according to the transmitted message from the terminal; the user ID being included in the message transmitted therefrom; and means adapted to transmit an access permission command to the access means when the determining means determines that the at least one registered user ID and the transmitted user ID from the terminal coincide with each other, and when the determining means determines that the at least one registered user ID and the transmitted user ID do not coincide with each other, to transmit an access inhibition command to the access means, wherein the access means is adapted to make access to the memory only when the access permission command is transmitted to the access means.

For achieving such objects, according to further aspect of the present invention, there is provided a data management unit in a computer system, the computer system having a computer in which the data management unit is incorporated, and a terminal intercommunicating with the computer, the data management unit comprising: first storage means having a memory for storing, in addresses on the memory, data items to which the terminal is adapted to make access; second storage means for storing thereon parameters concerning a data structure of each data item, the parameters including a data name of each data item, a data type of each data item, an address related to each data item on the memory and an array information of at least one data item, the at least one data item having an array structure, the array information including a number of array elements; third storage means for storing thereon a number of bytes corresponding to each data type of each data item; producing means for making, according to the parameters concerning the data structures of the data items and the numbers of bytes of the data types, an address related to each data item in array element units on the memory correspond to each data name of each data item so as to produce a data table; access means adapted to retrieve the data table according to a message transmitted from the terminal so as to be capable of making access to the memory based on the retrieved result, the message including a user ID; means for registering user groups, the user groups being permitted to make access to the memory; means for setting at least one user ID so to belong to the at least one user group; means for determining whether or not the user ID from the terminal belongs to at least one of the registered user groups according to a registered content of the registering means and a set content of the setting means, the user ID being included in the message transmitted from the terminal; and means adapted to transmit an access permission command to the access means when the determining means determines that the transmitted user ID belongs to the at least one of the registered user groups, and when the determining means determines that the transmitted user ID do not belong to the at least one of the registered user groups, to transmit an access inhibition command to the access means, wherein the access means is adapted to make access to the memory only when the access permission command is transmitted to the access means.

To achieve such objects, according to still further aspect of the present invention, there is provided a computer system comprising: a computer in which the data management unit according to claim 1 is incorporated; a terminal intercommunicating with the computer; a card that a user has, the card storing thereon a user name and a password of the user; and means for reading the user name and the password from the card so as to authenticate whether or not the user is permitted to use the terminal.

In order to achieve such objects, according to still further aspect of the present invention, there is provided a computer-readable storage medium comprising: data items to which a computer is adapted to make access; a parameter file storing thereon parameters concerning a data structure of each data item, the parameters including a data name of each data item, a data type of each data item, an address related to each data item on the memory and an array infraction of at least one data item, the at least one data item having an array structure, the array information including a number of array elements; a table storing thereon a number of bytes corresponding to each data type of each data item; and means for causing a computer to make, according to the parameters concerning the data structures of the data items and the numbers of bytes of the data types, an address related to each data item in array element units correspond to each data name of each data item so as to produce a data table.

As described above, according to the present invention, the producing means produces, from the parameters concerning the data structures of the data items of the second storage means and the numbers of bytes of the data types, the data table including the address related to each data item in array element units on the memory and each data name of each data item corresponding to each other.

Therefore, it is possible to access to the first storage unit (database) by using the data table from the terminal so as to obtain and change the data (data of a unit for control) therefrom, thereby accessing to the first storage unit by using the data name without any attention of the data address.

Specifically, the present invention is able to easily change the data address and the structure of data by only changing the stored contents on the second storage means.

Moreover, in the present invention, the data table is produced so that data access is permitted if the data description language and the language of program for data access are different from each other.

Furthermore, the present invention is adapted to reuse the data table and simplify the method of producing the data table so that it is possible to shorten time required to boot the data management unit.

In the present invention, it is able to select the memory or the auxiliary memory for storing thereon the data, making it possible to perform the data access in a large quantity.

Still furthermore, in the present invention, limitation information for limiting a content of access to each data item is stored in the second storage unit. Therefore, it is possible to improve the security required when data in the data management unit is used.

According to the present invention, when a user ID is inputted to the access means from a terminal, the determination means determines whether or not the user ID from the terminal belongs to at least one of the registered user, or whether or not the registered user ID and the transmitted user ID from the terminal coincide with each other so as to transmit the determination result by the determination means to the access means.

Therefore, access from an invalid user from a terminal to data in the data management unit to set or obtain data can be prevented.

In the present invention, the determination means periodically reads the registered contents of the registering means and the set contents of the setting means so as to periodically determine whether or not the user ID from the terminal belongs to at least one of the registered user groups according to the results periodically read from the registering means and the setting means.

Therefore, when the user who is able to access the access means is changed or the group to which the user belongs is changed, the contents of the update can periodically and reliably be reflected on the security checking function of the producing means.

The present invention permits the user ID or the user group which is able to use the method to be instructed to the user ID for each method of the access means. Therefore, setting of security in data process units can be performed.

In the present invention, because the reading means reads the user name and the password from the card so as to authenticate whether or not the user is permitted to use the terminal, it is possible to execute the double security by the terminal and the data management unit, whereby improving that security.

BRIEF DESCRIPTION OF THE DRAWINGS

Other objects and aspects of the present invention will become apparent from the following description of embodiments with reference to the accompanying drawings in which:

FIG. 5 is a diagram showing an example of a byte-number definition table according to the first embodiment;

FIG. 6 is a diagram showing an example of a data table produced by a data-table producing module according to the first embodiment;

FIG. 11 is a diagram showing an example of a parameter management file according to the third embodiment;

FIG. 13 is a diagram showing an example of a structure table produced by the process of the data-table producing module according to the third embodiment;

FIG. 14 is a diagram showing an example of a data table according to the third embodiment;

FIG. 15 is a diagram showing an example of a parameter management file according to a fourth embodiment;

FIG. 16 is a diagram showing an example of a structure table produced by a process of a data-table producing module according to the fourth embodiment;

FIG. 17 is a diagram showing an example of a data table according to the fourth embodiment;

FIG. 22 is a diagram showing an example of a data table according to the seventh embodiment;

FIG. 24 is a diagram showing an example of a parameter management file according to the eighth embodiment;

FIG. 26 is a diagram showing an example of a data table according to the eighth embodiment;

FIG. 28 is a diagram showing an example of a parameter management file according to a ninth embodiment of the present invention;

FIG. 29 is a diagram showing an example of a structure table according to the ninth embodiment;

FIG. 30 is a diagram showing an example of a data table according to the ninth embodiment;

FIG. 39 is a view showing an example of a user ID file according to the twelfth embodiment;

FIG. 40 is a view showing an example of a user assignment file according to the twelfth embodiment;

DETAILED DESCRIPTION OF THE PREFERRED EMBODIMENTS

Embodiments of a data management unit, a computer system and a computer-readable storage medium according to the present invention will now be described with reference to the drawings.

First Embodiment

Figure 1:
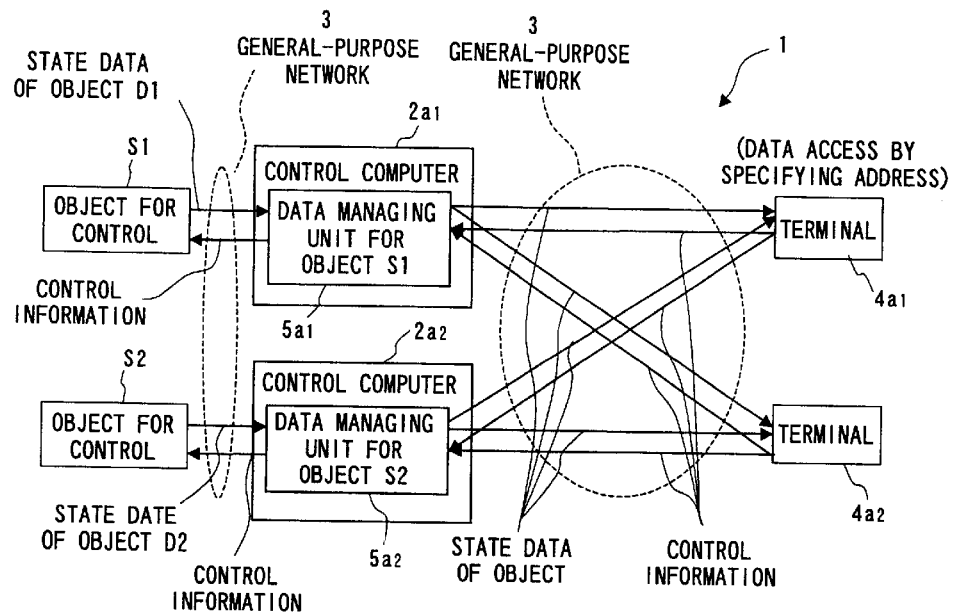
FIG. 1 is a block diagram showing schematic structures of a data management unit, a control computer in which the data management unit is installed and a control system according to a first embodiment of the present invention.

FIG. 1 is a block diagram showing schematic structures of a data management unit, a control computer in which the data management unit is installed and a control system.

As shown in FIG. 1, the control system 1 comprises control computers 2a1, 2a2, . . . , provided for correspond equipment devices as objects for supervisory control (hereinafter, described merely as objects) S1, S2, . . . , (in FIG. 1, for example, the number of the objects is two). Moreover, the control system 1 comprises terminals 4a1, 4a2, . . . , (in FIG. 1, for example, the number of the terminals is two) intercommunicating with the control computer 2a1, 2a2, . . . , through a general-purpose (public) network 3, such as Internet, telecommunication circuit, wide area network, and so on.

In the control system 1, the control computers 2a1, 2a2, . . . , provided corresponding to the objects S1, S2, . . . , have data management units 5a1, 5a2, . . . , for managing state data obtained from the corresponding objects to be controlled and control data for the objects.

Figure 2:
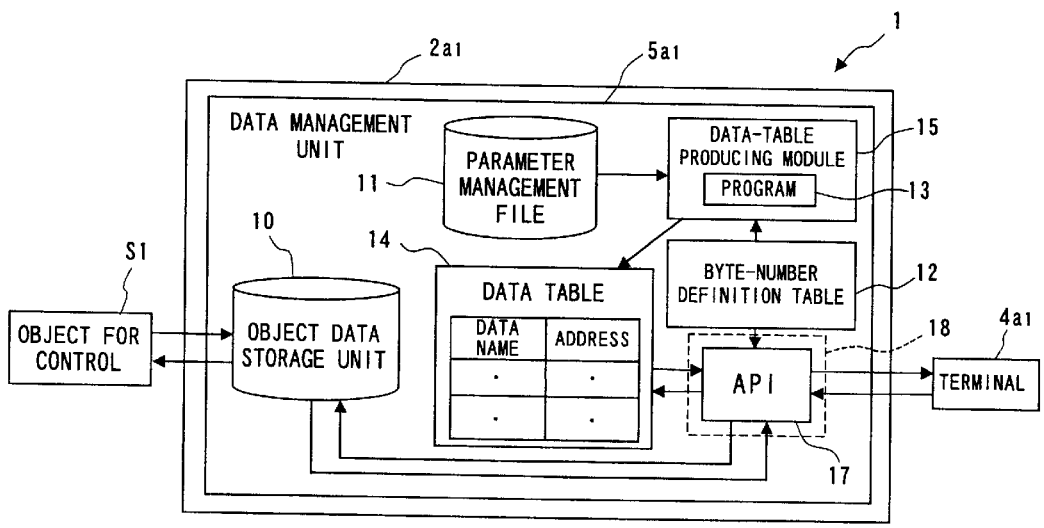
FIG. 2 is a block diagram showing the schematic structure of the control computer in the control system shown in FIG. 1.

FIG. 2 is a block diagram showing the schematic structure of the control computer 2a1 in the control system 1. Incidentally, FIG. 2 focuses on one control computer 2a1 so that the illustrations of the object S2, the control computer 2a2, the terminal 4a2 and the general-purpose network 3 are omitted in FIG. 2. In addition, FIG. 3 is a hardware structure of the control computer shown in FIG. 2.

Figures 3, 4:
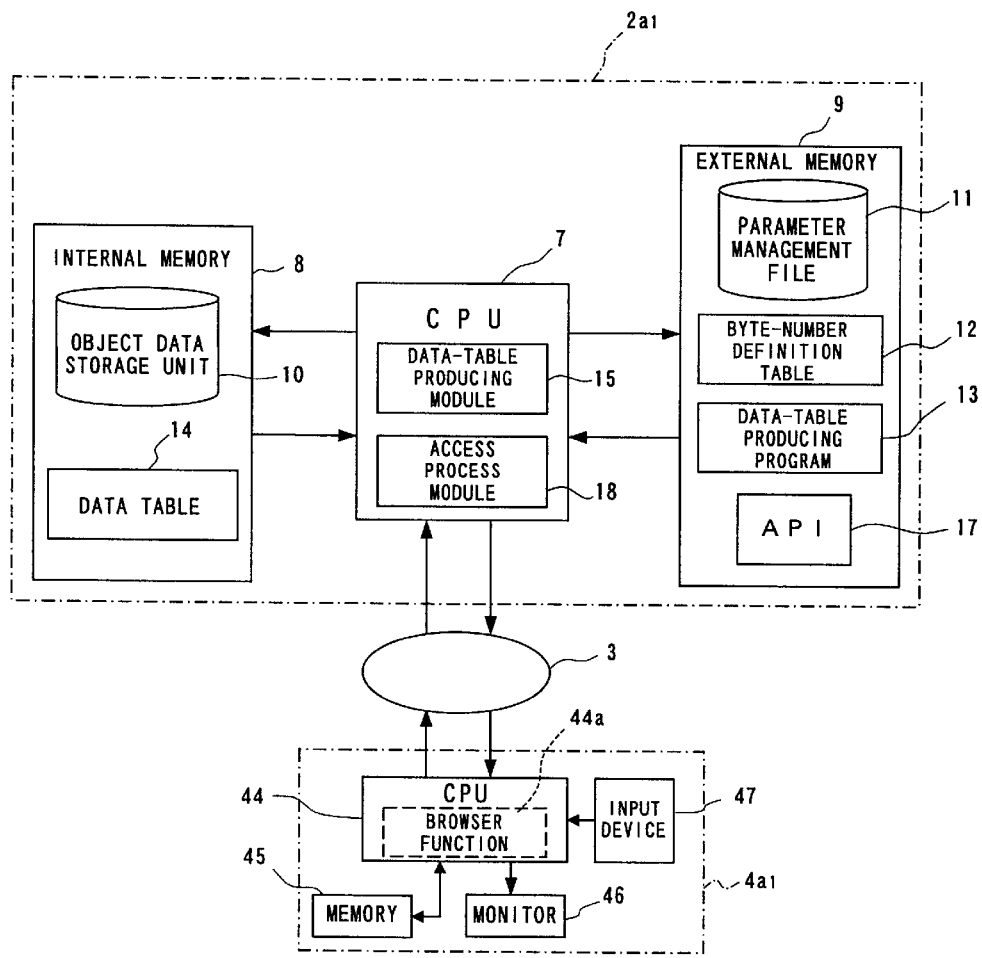
FIG. 3 is a hardware structure of the control computer shown in FIG. 2.
FIG. 4 is a diagram showing an example of a parameter management file according to the first embodiment.

As shown in FIGS. 2 and 3, the control computer 2a1 comprises, as hardware components, a CPU 7 having an interface function in accordance with a communication protocol corresponding to the kind of the general-purpose network 3 for data communication therethrough; an internal memory (a main memory) 8, such as SRAM, a DRAM and the like; and an external memory (an auxiliary memory) 9, such as a hard disk, an FROM (a flush ROM permitting high speed writing) or the like.

Thus, the data management unit 5a1 is installed in the control computer 2a1 and operative to manage data in the control computer 2a1 by using the hardware components (the CPU 7, the internal memory 8 and the external memory 9) of the control computer 2a1.

That is, the data management unit 5a1, as shown in FIG. 2, comprises an object data storage unit (a database) 10 for storing thereon data (object data) D1 related to the corresponding object S1 including state data collected from the object S1 and control data for controlling the object S1. Moreover, the data management unit 5a1 also comprises a parameter management file 11 for storing thereon parameters concerning the data structure of the object data D1 so that these parameters are corresponded with each other.

The parameters related to the data structure of each object data item of the object data D1 includes, for example, the data type of each object data item, the data name thereof, the number of array elements thereof, the number of array dimensions thereof and the top address of each name thereof. Each top address of each data name of each object data item is a number of bit pattern (for example, 8-bit pattern (1-byte)) identifies a location of each top address of each object data item in the object data storage unit 10.

FIG. 4 is a diagram showing an example of the parameter management file 11. Referring to FIG. 4, parameters (the data type, the data name, the number of array dimensions, the number of array elements and the top address for each data name) concerning the data structure of each data item of the object data D1(0), D1(1), . . . of the object S1 are made to correspond to each other. Moreover, the parameters are stored in the parameter management file so as to be sorted in an ascending order in accordance with, for example, the top address of each object data item D1(0), D1(1), D1(2), D1(3), . . . on the data storage unit 10.

Note that a state where the number of array dimensions is zero indicates data having no array. A state where the number of array dimensions is one indicates data in a one-dimensional array. The object data item D1(2) having data name "data1" shown in FIG. 4 has one array dimension and sixteen array elements so that the object data item D1(2) shows 16 elements of data "data1 (16)" in a one-dimensional array. Each address of each object data item is a hexadecimal digit.

In a case where the data structure (the address, the data type or the like) of the object data item stored on the object data storage unit 10 is changed, the content of the parameters stored on the parameters management file 11 are rewritable in accordance with the changed data structure by operating for example, the terminal 4a1 by a manager (a maintenance manager, operator) for the data management unit 5a1.

Furthermore, the data management unit 5a1 comprises a byte-number definition table 12 stored on the external memory 9 and including the number of bytes defined for each data type of each object data item.

That is, as shown in FIG. 5, the byte-number definition table 12 stores thereon the number of bytes (for example, 4 or 2) corresponding to the data types (int, short and the like) of the data description languages of the object data items.

In addition the data management unit 5a1 comprises a data-table producing module 15, which is realized as the function (operation) of the CPU 7.

The data-table producing module 15 is operative to, when the control component 2a1 has been booted (that is, when the data management unit 5a1 has been started up), execute a data-table producing process in accordance with a data-table producing program 13 stored on the external memory 9 on the basis of the parameter management file 11 and the byte-number definition table 12 so as to produce a data-table (file) 14 on the internal memory 8.

That is, the data-table producing module 15 makes a reference to the byte-number definition table 12 so as to read the number of bytes of each data type of each object data item stored on the parameters management file 11.

In accordance with the read number of bytes of each object data item and the top address of each data name of each object data item stored in the parameter management file 11, the data-table producing module 15 calculates the top addresses of all elements of all object data items for each array element according to the number of array dimensions and the number of array elements.

Thus, the data-table producing module 15 makes the calculated top addresses of the elements of the object data items for each array element (in array element units) correspond to the corresponding parameters (the data type, the data name and the number of array dimensions), data numbers and array numbers so as to produce the data table 14.

FIG. 6 is a diagram showing an example of the data table 14 produced by the data-table producing module 15.

As shown in FIG. 6, the data table 14 stores the data number, the data type, the data name, the number of array dimensions, the array number and the top address of each of all elements of all object data items in array element units so that these parameters are corresponded to each other.

The data numbers shown in FIG. 6 are serial numbers each of which is given to each data name. The array numbers are serial numbers given in accordance with the number of the array elements of the parameter management file 11 shown in FIG. 4, wherein the array numbers are the serial numbers given to the respective array elements in the respective arrays.

In a case of the object data item D1(2) (data number: 2) having data name "data1", the object data item D1(2) has an array structure so that the number of array elements is 16. Therefore, 16 data elements for each array element constituting the object data item D1(2) ("data1") are given array numbers 0 to 15, respectively.

Incidentally, in a case where the data description language of the object data item stored on the object data storage unit 10 is changed, the contents which are stored on the data table 14 are rewritable in accordance with the changed specification of the data description language by operating, for example, the terminal 4a1 by the manager (the maintenance manager) for the data management unit 5a1.

Furthermore, the data management unit 5a1 comprises an API (Application Programming Interface) 17 stored on, for example, the external memory 9 and serving as an interface program among the terminals 4a1, 4a2, ..., and the data management unit 5a1. The data management unit 5a1 also comprises an access process module 18 which is realized as the function (operation) of the CPU 7 and operates in accordance with the API 17 read from the external memory 9 so as to make access to the object data storage unit 10.

The API 17 is an object oriented program described in an object oriented program language, such as Java (trade made of Sun Microsystems). The API 17 is constituted by class units for each type of each object data item concerning the object S1 for control.

Each class of the API 17 includes a large number of methods indicating the data access rules (the functions, procedures) in accordance with the contents of data accesses to the object data storage unit 10.

In this embodiment, the API 17 includes a method M1 of a program in the following form:

int getMax (String dataname)

The method M1 shows a function as follows.

That is, the method M1 causes the access process module 18 (the CPU 7) to retrieve (search), by using the received data name "dataname" as the argument, the top address and the data type corresponding to the data name from the data table 14 so as to make a reference to the byte-number definition table 12, thereby recognizing the data length of the retrieved data type, thus reading the object data item corresponding to the top address of the retrieved data name and corresponding to the recognized data length from the object data storage unit 10 so as to return the read object data item to the terminal 4a1 from which a message including the data name "dataname" is transmitted".

In addition, the structure of the data management unit 5a2 is substantially similar to that of the data management unit 5a1 except that the object for control is S2 and the object data is data concerning the object S2.

Each of the terminals 4a1, 4a2, ..., as shown in FIG. 3, comprises a CPU 44, a memory 45, a monitor 46 and an input device 47.

The memory 45 stores thereon a database browsing and displaying program, such as a browser, and a communication program (communication software module).

The CPU 44 has a browsing function 44a for browsing the database through the general-purpose network 3 to display the contents of the database on the monitor 46 in accordance with the browsing and displaying program and a data communication interface function through the general-purpose network 3 based on a communication protocol corresponding to the kind of the general-purpose network 3 in accordance with the communication program.

The monitor 46 has a screen on which the contents of the browsed database are displayed.

The input device 47 including for example a keyboard, a pointing device and so on is operative to input information to the CPU 44, including access information (a message) in cooperative with the screen of the monitor 46.

The overall operation of the data management unit 5a1 of the present invention will now be described such that the operation of the access process module 18 is mainly described.

In this embodiment, when a remote operation is performed by operating the input device 47 by the manager of the data management unit 5a1 so that the CPU 44 remotely controls the data management unit 5a1 (the control computer 2a1) through the general-purpose network 3, the data management unit 5a1 (the control computer 2a1) is booted. Thus, the data-table producing module 15 of the booted data management unit 5a1 executes the data-table producing process so as to produce the data table 14 shown in FIG. 6 on the internal memory 8.

In accordance with the boot of the data management unit 5a1, the object data D1 including real time state data of the object S1 collected therefrom is stored on the object data storage unit 10 of the data management unit 5a1.

At this time, an operator at the terminal for supervising and controlling the object S1 operates the input device 47 of the terminal 4a1 so as to input a data obtaining message corresponding to the method M1. That is, the operator inputs the name (for example, "max" shown in FIG. 4 and the like) of the object data which the operator is desirable to supervise and control The input data name "max" is transmitted to the data management unit 5a1 of the control computer 2a1 through the general-purpose network 3 owing to the communication process performed by the CPU 44.

Figure 7:
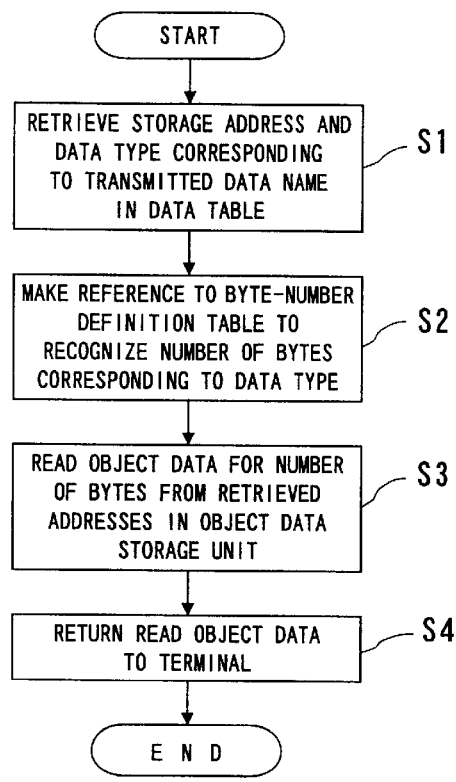
FIG. 7 is a schematic flow chart showing an example of object-data obtaining process by an access process module according to the first embodiment.

The access process module 18 of the data management unit 5a1 reads the method M1 of the API 17 in response to the transmitted data name "max". In accordance with the method M1, the access process module 18 performs an object-data obtaining process shown in FIG. 7.

That is, the access process module 18 retrieves the top address (a0000000 which is a hexadecimal digit) and the data type (int) corresponding to the data name "max" in the data table 14 (Step S1). Thus, the access process module 18 recognizes the number of bytes (4 bytes) corresponding to the retrieved data type (int) in the byte-number definition table 12 (Step S2).

Then, the access process module 18 makes access to the object data storage unit 10 to read the object data, item D1(0) stored at the addresses (a0000000 to a0000003) for four bytes with reference to the retrieved top address (a0000000) (Step S3). Then, the access process module 18 returns the read object data item D1(0) having the size of four bytes (their data name is "max") to the terminal 4a1 through the general-purpose network 3 (Step S4). Then, the process of the access process module 18 is completed.

At this time, the browser function of the CPU 44 is performed in accordance with the database browsing and displaying program in the memory 45 so that the transmitted object data item is displayed on the screen of the monitor 46 of the terminal 4a1. As a result, the manager (operator) is able to supervise the required object data item by watching the screen of the monitor 45.

When the operator requires to supervise and control object data (array data) constituting the array in array element units, the operator operates the input device 47 of the terminal 4a1 so as to input the array number (for example "2") in addition to the name of array data (for example "data1" shown in FIG. 4 and so forth) as a data obtaining message. The input name of the array data and the array number are transmitted to the control computer 2a1 by the process performed by the CPU 44.

At this time, the access process module 18, in Step S1, retrieves, from the data table 14, the top address (a0000010 which is a hexadecimal digit) and the data type (int) corresponding to the transmitted data name "data1" and the array number "2". Note that the other processes are similar to the processes which are performed for the object data item with the non-array structure having the foregoing data name "max".

As described above, according to this embodiment, the data management unit 5a1 is provided with the parameter management file 11 for storing thereon the parameters (the data type, the data name, the number of array dimensions, the number of array elements and the top address for each data name) concerning the data structure of each object data item. Moreover, the data management unit 5a1 is provided with the data table 14 produced in accordance with the parameter management file 11 and including the top addresses of all of object data items in the array element units in the object data storage unit 10. Therefore, the API 17 which is a data access process program can be constituted as a program that has no relation to parameters dependent on the data structure of the object data item so that the API 17 permits the access process module 18 to access the object data storage unit 10 when predetermined parameters (for example, the data name, the array number or the like), in the data table 14 have been transmitted from the terminal 4a1, thereby transmitting the object data item corresponding to the transmitted parameters to the terminal 4a1 from which the parameters are transmitted.

That is, because the API 17 according to this embodiment is a program which does not depend on the data structure of the object data item, it is possible to flexibly adapt a plurality of object data items having different data structures collected from a plurality of objects for supervisory control without a necessity for changing the structure of the API 17 itself.

In particular, this embodiment enables adaptation to a case where the data structure (the address, the data type or the like) of the object data item stored on the object data storage unit 10 is changed by only changing the parameter management file 11 without a necessity for changing the API 17, making it possible to flexibly adapt the change in the data structure (the address, the data type or the like) of the object data item.

In addition, in his embodiment, it is permitted to read the object data (object data item), by only inputting at least one parameter such as the data name and the array number from the terminal 4a1, corresponding to the inputted parameter from the object data storage unit 10 without inputting the complicated address in the object data storage unit corresponding to the object data, making it possible to improve the performance of the human-machine interface and operational performance of the terminal related to the access of the object data storage unit 10.

Furthermore, in this embodiment, to use the data table 14 and the byte-number definition table 12 having the number of bytes of data corresponding to the data type of the description language of the object data item permits changing the data type of the object data described in a description language which is different from the description language in the API 17 into the number of bytes whereby it is possible to read the object data from the object data storage unit 10 as the data having the foregoing number of bytes by the API 17 described in the description language which is different from the description language of the object data.

Therefore, the common and standardized API 17 can be used for a plurality of data management units of control computers corresponding to a plurality of objects for supervisory control, making it possible to make the API 17 and the control computer installing the API 17 generalized (versatile).

Second Embodiment

Figure 8:
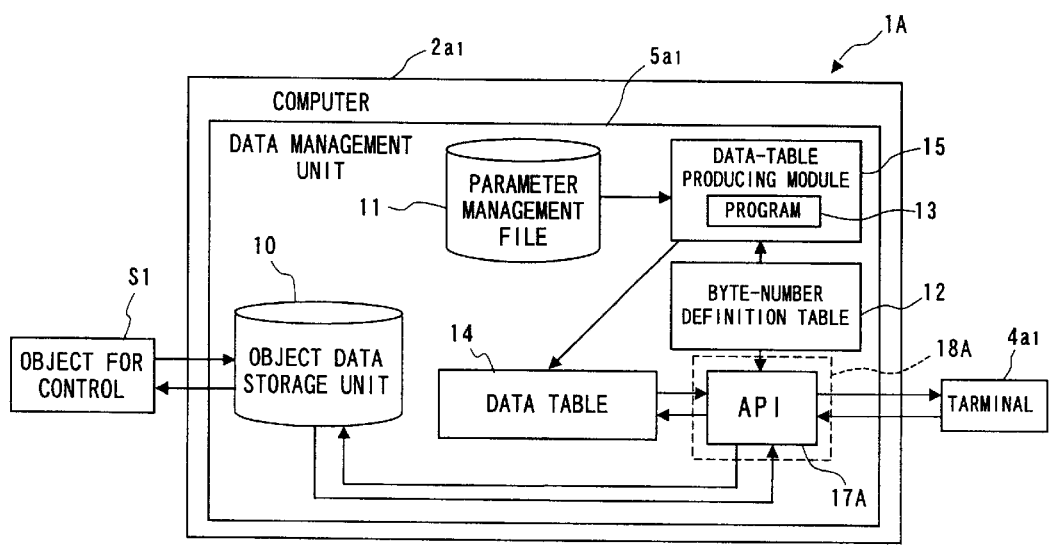
FIG. 8 is a block diagram showing a schematic structure of a control system including a control computer in which a data management unit is incorporated according to a second embodiment of the present invention.

FIG. 8 is a block diagram showing the schematic structure or a control system 1A including a control computer in which a data management unit is installed according to a second embodiment of the present invention. Similar elements to those of the elements of the control system 1 and the data management unit 5a1 shown in FIGS. 1 and 2 are given the same reference numerals so that the similar elements are omitted from description or described simply.

Referring to FIG. 8, an API 17A stored in an external memory 9 has a method M2 in the following form in addition to the method M1.

boolean setMax (String dataname, int maxvalue)

The method M2 has a function as follows.

That is, the method M2 causes an access process module 18A to retrieve, by using the received data name "dataname" and the control data volume "maxvalue" as the arguments, the top address and the data type corresponding to the data name from the data table 14 so as to make a reference to the byte-number definition table 12, thereby recognizing the data length of the retrieved data type, thus storing (setting) the control data value in the top address according to the recognized data length.

In addition, the access process module 18A operates in accordance with the API 17A in response to the data name and the control data value serving as control information (access information) supplied from the terminal 4a1 so as to make access to the object data storage unit 10.

Similarly to the first embodiment, when the data table 14 shown in FIG. 6 has been produced on the internal memory 8, the operator at the terminal 4a1 operates the input device 47 of the terminal 4a1 so as to input a message for setting a data value, for example a setting value for use in setting a relay.

That is, the operator inputs, as the message, the name (for example, "max" shown in FIG. 4 and so forth) of the control data for the object S1 and the control device value ("the value of maxvalue") which must be set. The input data name "max" and "the value of maxvalue" are transmitted to the data management unit 5a1 of the control computer 2a1 through the general-purpose network 3 owing to the process performed by the CPU 44.

At this time, the access process module 18A of the data management unit 5a1 reads the method M2 in the API 17A according to the transmitted data name "max" and the "the value of maxvalue". In accordance with the method M2, the access process module 18A performs the processes in Steps S1 and S2 shown in FIG. 7. Thus, the access process module 18A recognizes the top address (a0000000) and the data type (int) corresponding to the data name "max" and the corresponding number of bytes (4 bytes).

Figure 9:
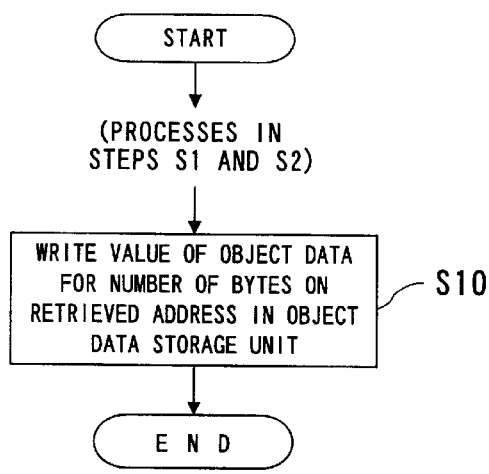
FIG. 9 is a schematic flow chart showing an example of process by an access process module according to the second embodiment.

Then, the access process module 18A makes access to the object data storage unit 10 so as to write the input "the value of maxvalue" on the addresses (a0000000 to a0000003) for 4 bytes with reference to the retrieved top address (a0000000). Then, the process is completed (Step S10 shown in FIG. 9).

When control data are stored in the addresses (a0000000 to a0000003) in the object data storage unit 10, the previously stored value of the control data in the addresses (a0000000 to a0000003) are updated to the new control data value corresponding to the "value of maxvalue".

Then, the object S1 reads the value of the control data "the value of maxvalue" written in the addresses (a0000000 to a0000003) in the object data storage unit 10 so that the object S1 is controlled in accordance with the value of control data "the value of maxvalue".

When the operator requires to set the value of control data in array element units of the object data item (array data element) which constitutes the array, the operator operates the input device 47 of the terminal 4a1. That is, the operator inputs the name of array data (for example "data1" shown in FIG. 4), the array number (for example "2") and the value of control data. The input array data name, the array number and the value of control data are transmitted to the control computer 2a1 by the process of the CPU 44.

According to the transmitted data, the access process module 18A, in Steps S1 and S2, retrieves the transmitted data name "data1", the top address (a0000010 which is a hexadecimal digit) corresponding to the array number "2" and the data type (int) from the data table 14. Note that the other processes are similar to the processes which are performed to set the value of object data item in the non-array structure, such as the forgoing data name "max".

As described above, this embodiment is, similarly to the first embodiment, able to cause the API 17A which is a data access process program to constitute a program that has no relation to parameters dependent on the data structure of the object data item so that the API 17A permits the access process module 18A, when a predetermined parameter (for example, the data name) in the data table 14 and the value of the object data have been transmitted from the terminal 4a1, to make access to the object data storage unit 10 so as to write (set) the value of the transmitted object data in the address corresponding to the transmitted parameter. That is, the API 17A can be constituted as the program which does not depend on the data structure of object data, making it possible to flexibly adapt a plurality of object data having different data structures collected from a plurality of objects for supervisory control without a necessity for changing the structure of the API 17A itself.

In addition, in this embodiment, it is possible to flexibly adapt, by only changing the parameter management file 11, the change of the data structure (the address, the data type or the like) of the object data stored on the object data storage unit 10 without a necessity for changing the API 17A.

In this embodiment, only inputting the data name and the value of control data which the operator desires to set from the terminal 4a1 permits writing the value of control data in the corresponding address in the object data storage unit 10 without inputting a complicated address, making it possible to improve the performance of the human-machine interface and operational performance of the terminal related to the access to the object data storage unit 10.

Similarly to the first embodiment, this embodiment enables the API 17A described in a description language which is different from the description language of the object data to write the control data value in the object data storage unit 10 as data having the recognized number of bytes. Therefore, it is possible to make the API 17A and the control computer having the API 17A generalized (versatile).

Third Embodiment

Figure 10:
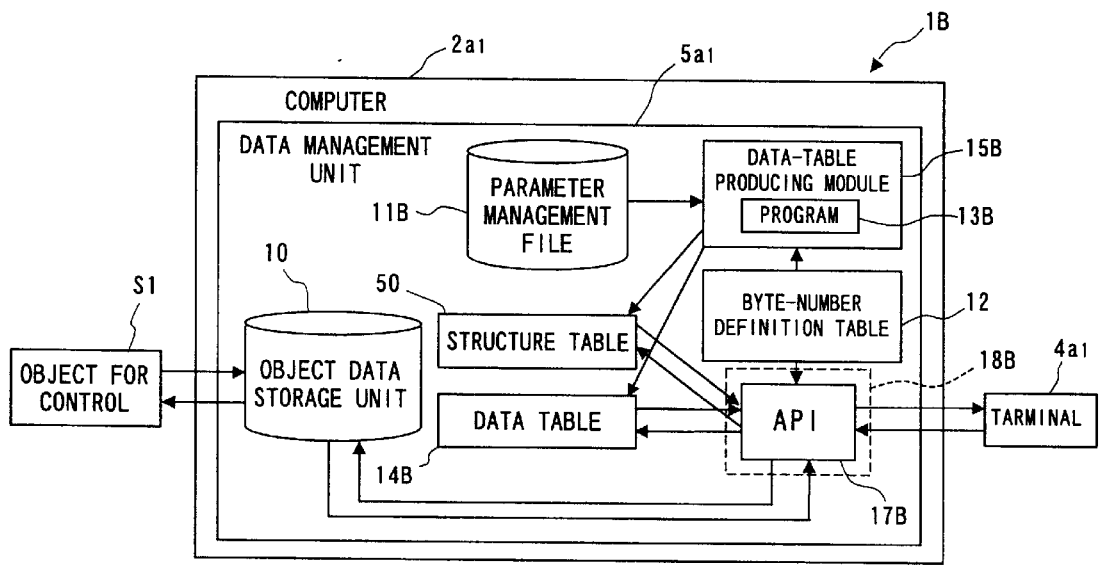
FIG. 10 is a block diagram showing a schematic structure of a control system including a control computer in which a data management unit is installed according to a third embodiment of the present invention.

FIG. 10 is a block diagram showing the schematic structure of a control system 1B including a control computer in which a data management unit is installed according to a third embodiment of the present invention. Elements similar to those of the control system 1 and the data management unit 5a1 shown in FIGS. 1 and 2 are given the same reference numerals. The similar elements are omitted from description or described simply.

In this embodiment, the object data item includes a structure (hereinafter called a "structural data") formed by integrating a plurality of types of different data. The data management unit 5a1 comprises a parameter management file 11B having the parameters concerning the data structure of the structural data such that the parameters correspond to each other.

That is, as shown in FIG. 11, the parameters of structural data in structure units, which include the data type "structure", data name ("kouzou1", "kouzou2", . . . ,), the number of array dimensions "0", the number of array elements "0" and the top address ("a0000000", "a0000100", . . . ,) of structural data in structure units, are made to correspond to each other so as to be stored in the parameter management file 11B. Moreover, parameters (the data type, the data name, the number of array dimensions, the number of array elements and the top address of each data name) concerning the data structure of each structural data in structural units are made to correspond to each other so as to be stored in the parameter management file 11B next to the parameter in the corresponding structure units.

The data-table producing module 15B according to this embodiment, which is realized as a function of the CPU 7, when the control computer 2a1 is booted, that is, the data management unit 5a1 is booted, the data-table producing module 15B performs a data-table producing process in accordance with the data-table producing program 13B stored in the external memory 9 on the basis of the parameter management film 11B and the byte-number definition table 12 so as to produce the data table 14B and the structure table 50 on the internal memory 8.

Figure 12:
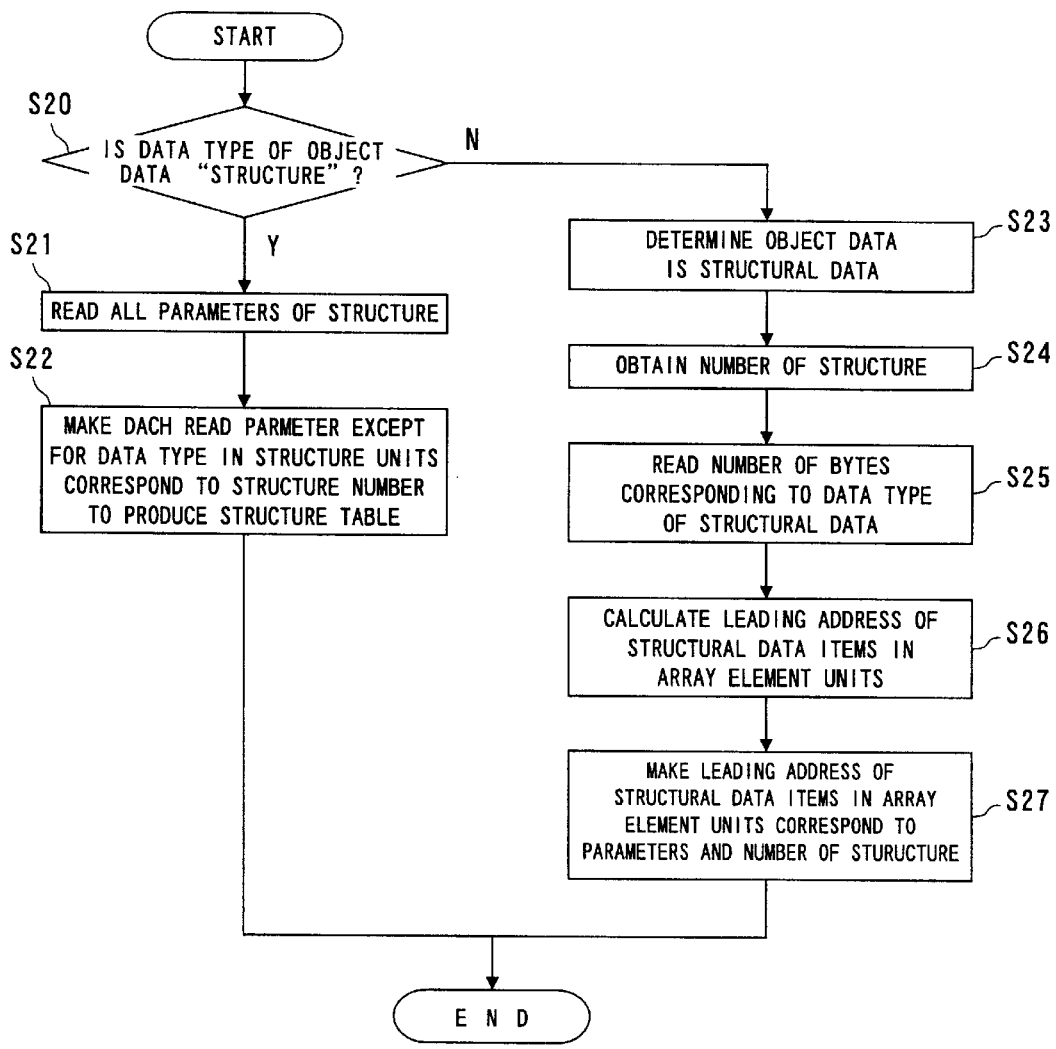
FIG. 12 is a schematic flow chart showing an example of process by a data-table producing module according to a third embodiment.

That is, the data-table producing module 15B, as shown in FIG. 12, examines the data type of each object data stored in the parameter management film 11B, and in a case where the data type is the "structure" (the decision in Step S20 is YES), reads all of the parameters of the "structure" therefrom (Step S21). Next, the data-table producing module 15B makes the each read parameter {the data name (the structure name), the number of array dimensions, the number of array elements and the top address} except for the read data type in the structure units correspond to the structure number (a serial number of each structure) so as to produce the structure table 50 on the internal memory 8 (Step S22).

FIG. 13 is a diagram showing an example of the structural table 50 produced by the process of the data-table producing module 15B.

As shown in FIG. 13, the structure table 50 has the structure number, the structure name, the number of array dimensions, the number of array elements and the top address in structure units so that the structure number, the structure name, the number of array dimensions, the number of array elements and the top address correspond to each other in every structures.

On the other hand, as a result of examining the data type of each object data, when the data type of each object data stored in the parameter management film 11B is a data type except for the "structure" (the decision in step S20 is NO), the data-table producing module 15B determines that each object data is a structural data constituting the "structure" (Step S23), and obtains the number of the structure in which the structural data is included from the structure table 50 (Step S24) so as to make a reference to the byte-number definition table 12 thereby reading the number of bytes corresponding to the data type of each structural data (Step S25).

According to the read number of bytes of each structural data and the top address of each of the corresponding data names, the data-table producing module 15B calculates the top addresses of all of structural data items in the array element units in consideration of the number of array dimensions and the number or array elements (Step S26).

Then, the data-table producing module 15B makes the calculated top addresses of all of structural data items in the array element units correspond to the corresponding parameters (the data type, the data name and the number of array dimensions), the data number (the serial number of structural data in the structure), the array number (the serial numbers of data in the array element units in the corresponding arrays) and the number of the structure so as to produce the data table 14B, as shown in FIG. 14 (Step S27).

The API 17B has method M3 and method M4 for making access to the structural data in addition to the method M1 and the method M2 according to the first and second embodiments.

The method M3 is a method for obtaining structural data corresponding to the method M1. The method M4 is a method for setting the value of structural data corresponding to the method M2.

The access process module 18B operates based on the API 18B according to the control information (access information) including the structure name and the name of structural data, or including the name of the structure, the name of structural data and the value of control data, which are supplied from the terminal 4a1, so as to make access to the object data storage unit 10.

That is, in this embodiment, similar to the first and second embodiments, when an operator at the terminal for supervising and controlling the object S1 operates the input device 47 of the terminal 4a1 so as to input the structure name (for example "kouzou1") required to be monitored and controlled and the name of structural data (for example, "max") in the corresponding structure, which is required to be monitored and controlled, the input structure name "kouzou1" and the structural data name "max" are transmitted to the data management unit 5a1 of the control computer 2a1 through the general-purpose network 3 by the communication process performed by the CPU 44.

At that time, the access process module 18B operates in response to the transmitted structure name "kouzou1" and the structural data name "max" so as to read the method M3 of the API 17B. According to the read method M3, the access process module 18B retrieves the structure number "0" corresponding to the structure name "kouzou1" from the structure table 50, and further retrieves the top address a0000000 and the data type "int" corresponding to the retrieved structure number "0" and the structural data name "max" from the data table 14B.

Next, the access process module 18B makes a reference to the byte-number definition table 12 so as to recognize the data length "4 bytes" of the retrieved data structure.

Then, the access process module 18B reads the structural data corresponding to the addresses (a0000000 to a0000003) from the top address "a0000000" of the retrieved structural data name "max" for 4 bytes from the object data storage unit 10 so as to return the read structural data to the terminal 4a1 from which transmission has been performed.

The returned structural data is displayed on the monitor screen of the terminal 4a1 by the process performed by the CPU 44. Therefore, the operator is able to supervise a required structural data by seeing the monitor screen.

On the other hand, when structure name (for example "kouzou2") to which control data value is required to be set, the name of structural data (for example, "default") to which the control data value in the corresponding structure is required to be set and control data value (for example, "default value") are transmitted from the terminal 4a1 to the data management unit 5a1 of the control computer 2a1 through the general-purpose network 3, the access process module 18B receives the transmitted structure name "kouszou2", the structural data name "default" and the control data value "default value" so as to read the method M4 in the API 17B.

In accordance with the method M4, the access process module 18B retrieves, by using the received structure name "kouzou2", the structural data name "default" and the control data value "default value" as the arguments, the structure number "1" corresponding to the structure name "kouzou2" from the structure table 50.

Next, the access process module 18B further retrieves the top address "a0000100" and the data type "int" corresponding to the retrieved structure number "1" and the structural data name "default" from the data table 14B, and makes a reference to the byte-number definition table 12 so as to recognize the data length "4 bytes" corresponding to the retrieved data structure "int".

Then, the access process module 18B writes (sets) the control data value "default value" in the addresses (a0000100 to a0000103) of the object data storage unit 10 at for four bytes from the top address "a0000100" of the retrieved structural data name "default".

As a result, the object S1 for supervisory control is controlled in accordance with the control data value "default value" written in the addresses (a0000100 to a0000103) in the object data storage unit 10.

When only one access structure is present in a certain method of the API 17B, the structure name including the structural data to which access is made is previously instructed in the program in the method to which the API 17B correspond. Thus, input of only the name of structural data from the terminal 4a1 is required to make access to structural data.

As described above, in this embodiment, by using the parameter management file 11B for storing the parameters concerning the data structure of each structural data and the structure table 50 for storing the parameters concerning the data structure in structure units produced in accordance with the parameter management file 11B, the data table 14B including the addresses of all of structural data items in the array element units is produced to be stored in the data management unit 5a1. Therefore, the API 17B, which is a program for the data access process, can be constituted as a program which does not depend on the data structure of object data in the structure form. Therefore, flexible correspondence to state data in a plurality of structure forms having different data structures and collected from a plurality of objects for supervisory control is permitted without a necessity for changing the API 17B.

Similarly to the first and second embodiments, this embodiment is able to flexibly correspond to change in the data structure (the top address, the data type or the like) of object data in the form of the structure by only changing the parameter management file 11B.

In this embodiment, by only inputting the structure name and the structure data name from the terminal 4a1, it is possible to read the structural data corresponding to the structure name and the structure data name from the object data storage unit 10.

Furthermore, by only inputting the structure name, the structural data name and control data value from the terminal 4a1, it is possible to write the control data value in the corresponding address on the object data storage unit 10.

Therefore, the necessity for inputting the complicated address can be eliminated, thereby improving the performance of the human-machine interface concerning the access to the object data storage unit 10.

Similarly to the first and second embodiments, in this embodiment, the API 17B described in a language which is different from the description language of object data permits the data access processing module 18B to write object data in the structure form in the object data storage unit 10 as data having the recognized number of bytes so that it is possible to make the API 17B and the control computer on which the API 17B is installed generalized (versatile).

Fourth Embodiment

The structure of a control system 1C incorporating a control computer including the data management unit according to a fourth embodiment of the present invention is similar to the structure of the control system 1B shown in FIG. 10. Therefore, the structure is omitted from illustration.

A parameter management file 11c of the data management unit 5a1 according to this embodiment, as shown in FIG. 15, has each parameter of each structural data in the structure units. That is, the data structure "structure", the data name ("kouzou1", "kouzou2", . . . ,), the number of array dimensions "0", the number of array elements "0" and the top addresses ("a0000000", "a0000100", . . . ,) are stored on the parameter management file 11C so as to be corresponded with each other.

Moreover, parameters except for the top address of each data name (the data type, the data name, the number of array dimensions and the number of array elements) concerning the data structure of each structural data in the element units are made to correspond to each other so as to be stored in the parameter management film 11B next to the parameter in the corresponding structure units.

FIG. 16 is a diagram showing an example of the structure table 50 produced by the process of the data-table producing module 15C.

As shown in FIG. 16, the structure table 50 has the structure number, the structure name, the number of array dimensions, the number of array elements and the top address in structure units so that the structure number, the structure name, the number of array dimensions, the number of array elements and the top address correspond to each other in every structures.

The data-table producing module 15C according to this embodiment is operated as follows, in similar to the processes of data-table producing module 15B.

When the data type of each object data stored in the parameter management film 11C is a type except for the "structure", the data-table producing module 15C determines object data is structural data constituting the "structure". Thus, the data-table producing module 15C obtains the number of the structure in which structural data is included from the structural table 50. Then, the data-table producing module 15C makes a reference to the byte-number definition table 12 so as to read the number of bytes of data corresponding to the data type (int, short, char, float and the like) of each structural data. In accordance with the top address of the structure and the read number of bytes of each structural data, the data-table producing module 15C calculates the top address of structural data in the non-array structure and the top address of structural data in the array structure in consideration of the number of array dimensions and the number of array elements, respectively.

Then, the data-producing module 15C makes the obtained top addresses of all of structural data items correspond to the corresponding parameters (the data type, the data name and the number of array dimensions); the data number (the serial number of structural data in the structural); the array number (the serial number of data in array element units in the corresponding array); and the structure number to each other so as to produce the data table 14C, as shown in FIG. 17.

For example, the parameters of first structural data (data name: max) of a structure "kouzou1", which include {data name "int", data name "max" and the number of dimensions "0"}, are made to correspond to data name "0", the array number "0", the structure number "0" and the top address (top address "a0000000" of the structure) to each other so as to be stored in the data table 14C.

At this time, because structural data having the data number "0" is 4-byte data in the form of "int", the addresses (a0000000) to (a0000003) are the region for storing the structural data having the data number "0". Thus, the top address of the parameters of structural data (data name: min) next to the structure "kouzou1", which include data structure "int", data name "min" and the number of dimensions "0" is obtained as address "a00000004" next to the address "a0000003". The parameters of the next structural data (data name: min) including data structure "int", the data name "min" and the number of dimensions "0" are made to correspond to data name "min", array number "0", structure number "0" and the obtained top address "a0000004" so as to be stored in the data table 14C.

That is, in this embodiment, it is possible to produce, without storing the top address of each structural data in the structure in the parameter management file 11C, the data table 14C including the top addresses of structural data items, thereby obtaining an effect in that the parameter management file 11C can easily be produced in addition to the effects obtainable from the first to third embodiments.

This embodiment is able to change each address of structural data in the structure by only changing the top address of the structure when the data structure of structural data in the structure is not changed.

Moreover, when the data table 14C is produced, the necessity for again calculating each address of structural data constituting the structure except for the structure having the changed top address can be eliminated, making it possible to shorten time required to produce the data table 14C.

Fifth Embodiment

Figure 18:
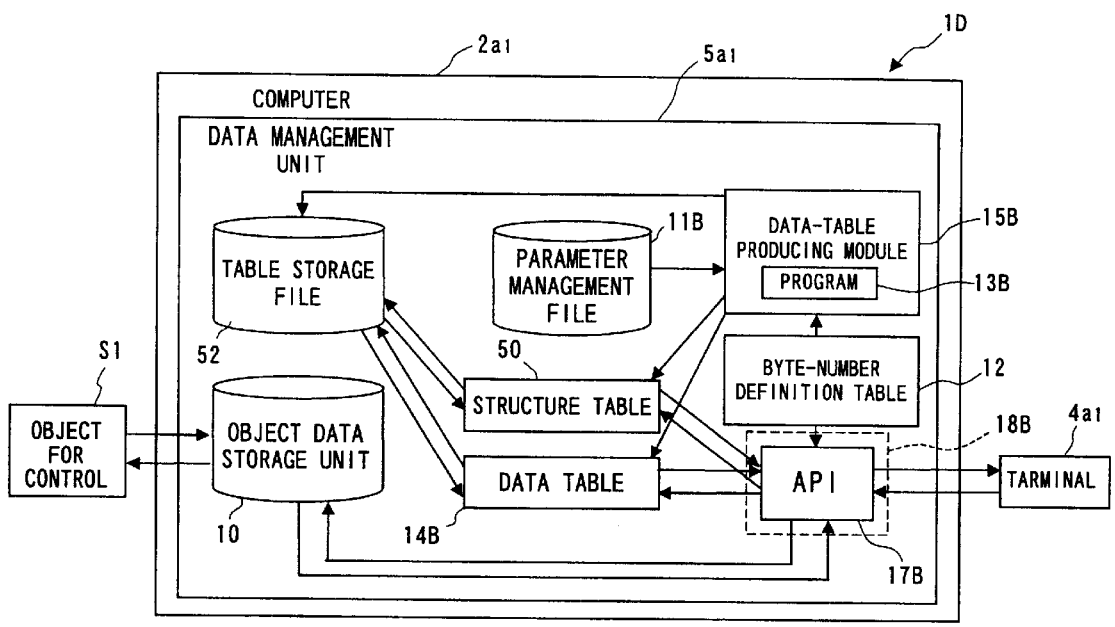
FIG. 18 is a block diagram showing a structure of a control system ID including a control computer in which a data management unit according to a fifth embodiment of the present invention.

FIG. 18 is a block diagram showing the structure of a control system 1D incorporating a control computer including a data management unit according to a fifth embodiment of the present invention.

As shown in FIG. 18, a data management unit 5a1 of a control computer 2a1 of the control system 1D comprises a table storage file 52 formed on the external memory 9 in addition to the structure of the control system 1B (the data management unit 5a1) according to the third embodiment shown in FIG. 10.

A CPU 7 according to this embodiment is adapted, when the operation of the data management unit 5a1 is interrupted (when the operation has been completed, that is, when the operation of the control computer 2a1 has been completed), to store the data table 14B stored in the internal memory 5 and the structure table 50 in the table storage file 52 on the external memory 9.

When the data management unit 5a1 is booted (when the control computer 2a1 is started up), the CPU 7 according to this embodiment loads the data table 14B and the structure table 50 stored in the table serving file 52 into the internal memory 8.

As a result, the access process module 18B of the data management unit 5a1, in accordance with the method M3 and the method M4 of the API 17B, performs an access process (the structural data obtaining process and the control data value setting process) to the object data storage unit 10 by using the data table 14B and the structure table 50 loaded on the internal memory 8.

As described above, in this embodiment, when the operation of the data management unit 5a1 has been completed (the operation of the control computer 2a1 has been completed), the produced data table 14B and the structure table 50 has stored on the external memory 9 (the table saving file 52).

That is, in the first to fourth embodiments, the data table 14B and the structure table 50 are stored in the internal memory 8. Therefore, when the operation of the data management unit 5a1 has been completed (when the operation of the control computer 2a1 has been completed), the data table 14B and the structure table 50 are not recorded, that is, deleted. As a result, the CPU 7 (the data-table producing module 15B) must produce the data table 14B and the structure table 50 whenever the data management unit 5a1 is booted (whenever the control computer 2a1 is booted).

However, in this embodiment, because the data table 14B and the structure table 50 are stored in the table saving file 52 on the external memory 9, the CPU 7 reads the data table 14B and the structure table 50 stored on the external memory 9 whenever the data management unit 5a1 is booted (whenever the control computer 2a1 is booted) so as to load the same into the internal memory 8.

As a result, it is possible to use the data table 14B and the structure table 50 immediately after the data management unit 5a1 is booted (immediately after the control computer 2a1 to booted), without executing the data table producing process.

Therefore, according to this embodiment, time (time required to boot the data management) required for the data management unit to be permitted to make access to the object storage unit 10 in accordance with the API can be shortened in addition to the effects obtainable from the first to fourth embodiments.

Note that the table storage file 52 according to this embodiment can be provided in the external memory 9 of each of the control systems 1, 1A and 1C (the data management unit 5a1) according to each of the first, second and fourth embodiments. The foregoing effect of shortening time required to turn the data management unit on can be obtained.

Sixth Embodiment

Figure 19:
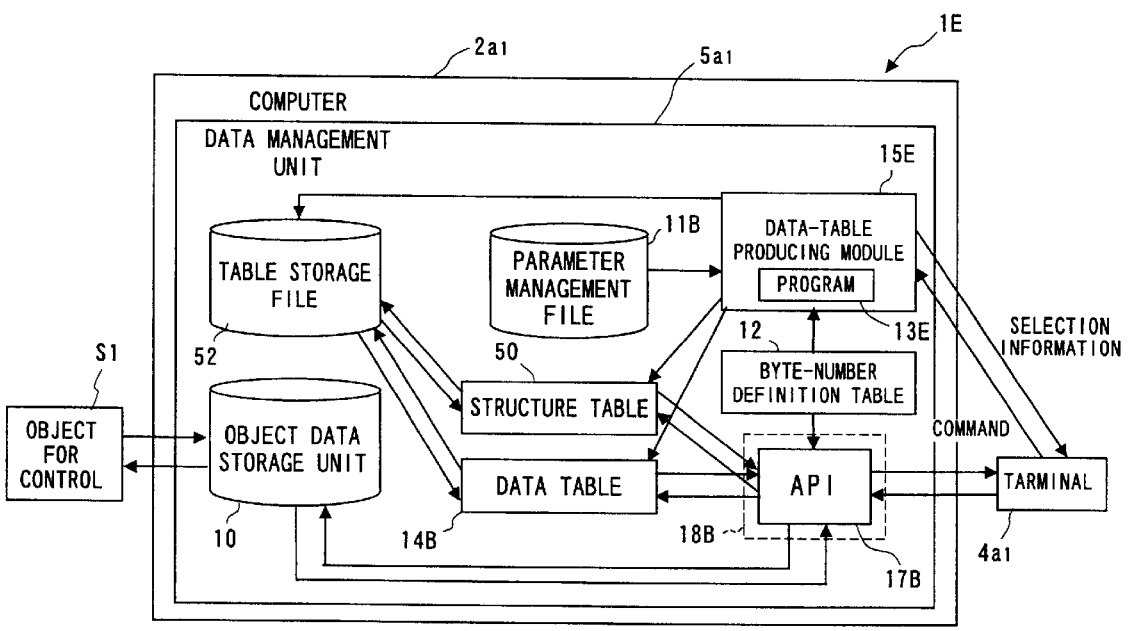
FIG. 19 is a block diagram showing a control system including a control computer in which a data management unit is installed according to a sixth embodiment of the present invention.

FIG. 19 is a block diagram showing a control system 1E including a control computer in which a data management unit according to a sixth embodiment of the present invention is installed.

The control system 1E according to this embodiment comprises a data-table producing module 15E of the data management unit 5a1 of the control computer 2a1. The data-table producing module 15E performs a process in accordance with the data-table producing program 13E, which is different from the process of the control system 1D shown in FIG. 18. Therefore, the other structures and operations are omitted from description.

In this embodiment, when the address or the data structure of object data is changed, only an operator who maintains the data management unit 5a1 is capable of changing the parameter management file 11B. When the change is performed by the operator, the data management unit 5a1 is restarted so as to again produce the data table 14B and the structure table 50.

Figure 20:
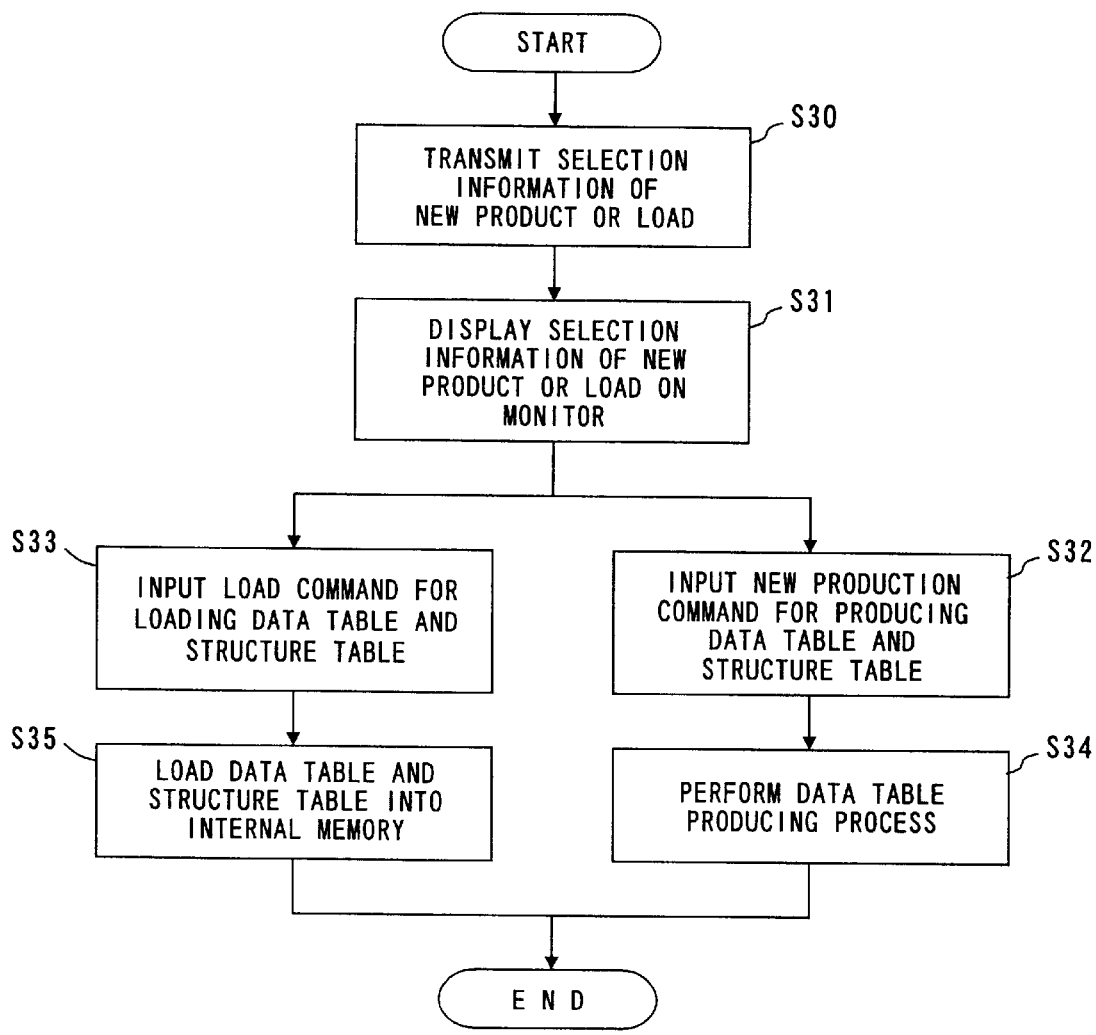
FIG. 20 is a schematic flow chart showing an example of processes by a data-table producing module and a terminal according to the sixth embodiment.

In this embodiment, when the data management unit 5a1 is started, the data-table producing module 15E transmits information (selection information of new production or load) to the terminal 4a1 through the general-purpose network 3 (Step S30 in FIG. 20).

That is, the transmitted information from the data-table producing module 15E includes information or inquiring whether a new data table 14B and a new structure table 50 will be produced or the data table 14B and the structure table 50 stored in the table storage file 52 are loaded therefrom.

In the terminal 4a1, the transmitted selection information is displayed on the screen of the monitor 46 by the process of the CPU 44 (Step S31).

In accordance with the displayed selection information, the operator at the terminal 4a1 performs the following operation. That is, when the parameter management file 11B is updated by the change in the address or of the data structure of object data after the data table 14B and the structure table 50 is produced in accordance with the parameter management file 11B, the operator operates the input device 47 of the terminal 4a1 so as to input a command (a new production command) for newly producing the data table 14B and the structure table 50 to the data-table producing module 15B of the data management unit 5a1. The input new production command is transmitted to the data management unit 5a1 of the control computer 2a1 by the process of the CPU 44 (Step S32).

On the other hand, in a case where the parameters (the address, the data type or the like) concerning the data structure of object data are changed after the data table 14B and the structure table 50 are produced so that the parameter management film 11B is not changed, the operator operates the input device 47 of the terminal 4a1. Thus, the operator inputs, to the data-table producing module 15B of the management unit 5a1, a command (a load command) for loading the data table 14B and the structure table 50 from the table storage file 52. The input command is transmitted to the data management unit 5a1 of the control computer 2a1 by the process of the CPU 44 (Step S33).

When the new production command is transmitted from the terminal 4a1, the CPU 7 according to this embodiment performs a data table producing process in accordance with the new production command. The process is performed in accordance with the data-table producing program 13E and the parameters concerning the data structure of object data in the parameter management file 11B (Step S34).

On the other hand, when the load command is transmitted from the terminal 4a1, the CPU 7 loads the data table 14B and the structure table 50 stored in the table storage file 52 into the internal memory 8 in response to the load command (Step S35).

As described above, according to this embodiment, in a case where the parameters (the address, the data type or the like) concerning the data structure of object data is changed, a data table and a structure table on which the contents of change are reflected can be produced when the data management unit is booted, similarly to the first to fifth embodiments, it is possible to flexibly quickly correspond to the change in the parameters concerning the data structure of object data.

In a case where the parameters concerning the structure of object data are not changed, the produced structure table and the data table stored in the table storage file 52 is again used.

Therefore, the necessity for producing the tables by using the data table producing program whenever the data management unit is started and restarted can be eliminated. Similarly to the fifth embodiment, it is possible to shorten time required to boot the data management.

Seventh Embodiment

The structure of a control system 1F incorporating a control computer in which a data management unit is installed according to a seventh embodiment of the present invention is similar to that of the control system 1E shown in FIG. 19. Therefore, the structure is omitted from illustration.

The parameter management file is similar to the parameter management file 11C shown in FIG. 15. The structure table is similar to the structure table 50 shown in FIG. 16.

A data-table producing module 15F according to this embodiment performs a data table processing process 13F in accordance with a data-table producing program 13F on the basis of the parameter management file 11C and the byte-number definition table 12.

That is, the data-table producing module 15F according to this embodiment determines, when the data type of each object data (object data item) stored in the parameter management file 11C is formed into a type except for the "structure", that the object data is structural data constituting the "structure". Then, the data-table producing module 15F obtains the number of the structure which includes structural data from the structure table 50 so as to make a reference to the byte-number definition table 12, thereby reading the number of bytes of data corresponding to the data type (int, short, char, float or the like), as shown in similar from Steps S23 to S25.

Figure 21:
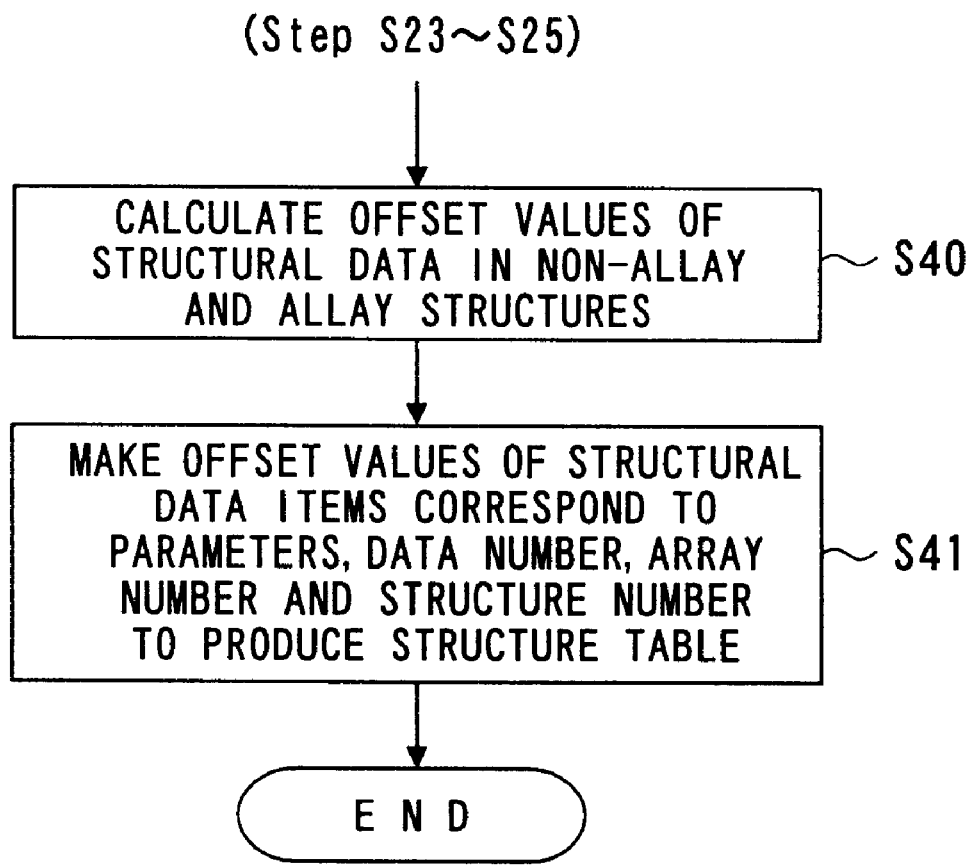
FIG. 21 is a schematic flow chart showing an example of processes by a data-table producing module according to a seventh embodiment of the present invention.

In accordance with the read number of bytes of each structural data, the data-table producing module 15F calculates the numbers of bytes (hereinafter referred as "offset values") of the structural data in the non-array structure and the array structure from reference points (start points) which are the top addresses of the structures, respectively (Step S40 in FIG. 21).

That is, the offset values of the structural data of the respective structures represents distances between the structural data thereof and the top addresses of the structures.

The data-table producing module 15F makes the obtained offset values of all of structural data items, as a substitute for the top address, correspond to the items including the corresponding parameters (the data type, the data name and the number of dimensions), the data number (the serial number of structural data in the structure), the array number (the serial number of data in array element units in the corresponding array) and the structure number. Thus, a data table 14F shown in FIG. 19 is produced (Step S41).

The data table 14F according to this embodiment is shown in FIG. 22.

For example, the second structural data of the structure "kouzou1", which has the data number "1", because the first structural data having the data number "0" is a 4-byte data in the form of "int". Therefore, the 4 bytes are obtained as the offset value. The parameters (the data type "int", the data name "min1" and the number of dimensions "0") of second structural data are made to correspond to the data number "1", the array number "0", the structure member "0" and the obtained offset value "4" so as to be stored in the data table 14F.

The data access process module 18F, in accordance with the API 17F, retrieves the structure number "0" corresponding to structural data (for example, the data name "data1" in the data table 14F shown in FIG. 22) from the structure table 50. Next, the Moreover, data access process module 18F retrieves the top address "a0000000", the offset value "8" and the data type "int" corresponding to the retrieved structure number "0" from the data table 14F.

The data access process module 18F recognizes the data size (length) "4 byte" of the retrieved data type by making a reference to the byte-number definition table 12. Then, the data access process module 18F obtains a value "a0000008" as the top address of structural data "data1" by adding the offset value (8 bytes) to the top address "a0000000" of the structural data name "data1" (the structure member "0"). Then, the data access process module 1 accesses (reads or writes data) to the addresses (a0000008 to a000000b) for 4 bytes from the top address "a0000008".

That is, according to this embodiment, when an operator who maintains the data management unit 5a1 changes the top address of the structure and does not change the arrangement of structural data in the structure, the structure table and the data table are produced from the parameter management file by only changing the top address of the structure. Therefore, it is possible to eliminate the necessity for again calculating the address of each structural data in the structure.

Hence, it is possible to shorten time required to produce the data table so as to decrease time required to boot the data management unit in addition to the effects obtaining from the first to sixth embodiments.

Eighth Embodiment

Figure 23:
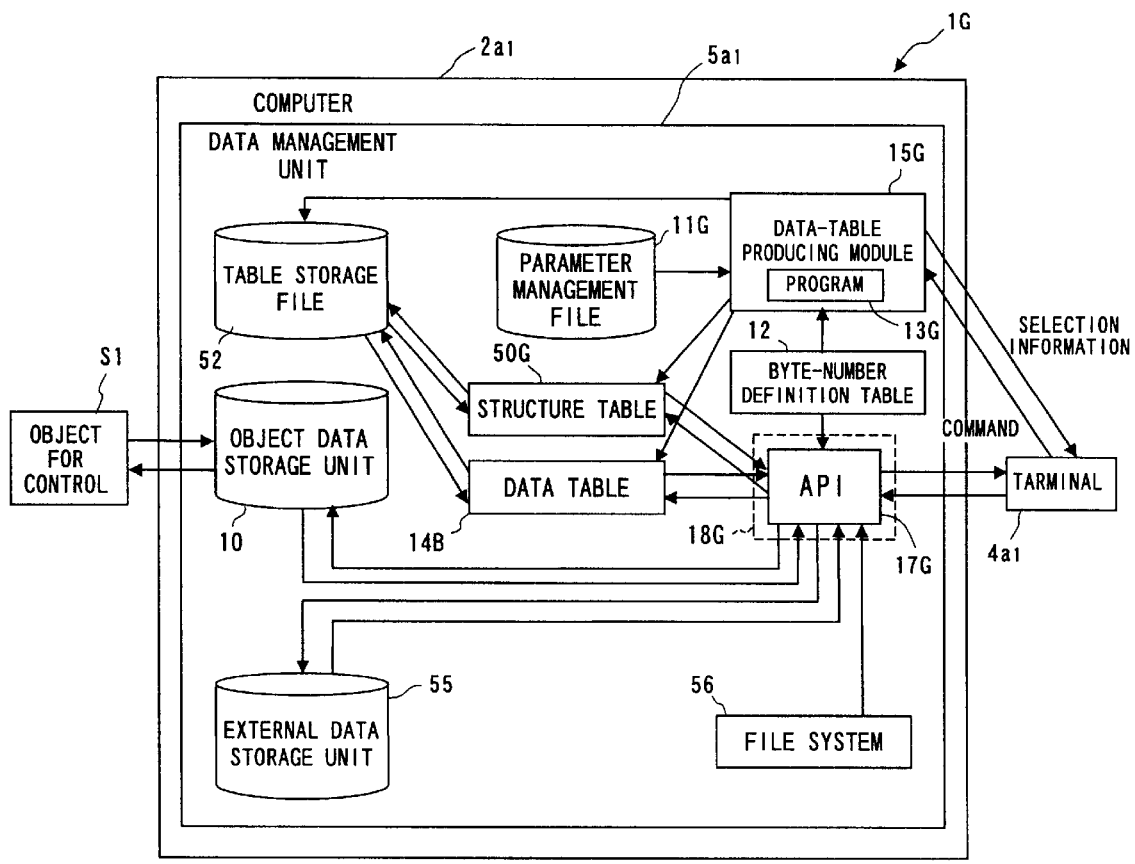
FIG. 23 is a block diagram showing a schematic structure of a control system including a control computer in which a data management unit is installed according to an eighth embodiment of the present invention.

FIG. 23 is a block diagram showing a schematic structure of a control system 1G including a control computer in which a data management unit is installed (incorporated) according to an eighth embodiment of the present invention. Note that similar elements to those of the control system 1E shown in FIG. 19 are given the same reference numerals.

The similar elements are omitted from description or described simply.

As shown in FIG. 23, the data management unit 5a1 of the control computer 21a1 in the control system 1G comprises, in addition to the object data storage unit 10 in the internal memory 8, an external data storage unit 55 constituted in an external memory 9 such as a hard disk and adapted to store object data thereon.

FIG. 24 is a diagram showing a parameter management file 11G according to this embodiment.

In the parameter management file 11G shown in FIG. 24, all of structural data items (elements) concerning the structure (the structure name "kouzou1") and all of structural data items concerning the structure (the structure name "kouzou2") are present in the internal memory 8. The positions in which data items are stored are specified with top addresses such that the position of "kouzou1" is a0000000 and that of "kouzou2" is a0000100.

In this embodiment, all of structural data items concerning the structure (the structure name "kouzou3") are present in a predetermined directory in the external data storage unit 55 constituted in the external memory 9 as the structure file. As an alternative to the top address in the structure units in the parameters in the structure units concerning the structure (the structure name "kouzou3"), the directory (for example, /usr/tmp) present in the external data storage unit 55 (the external memory 9) is stored in the parameter management file 11G.

Figure 25:
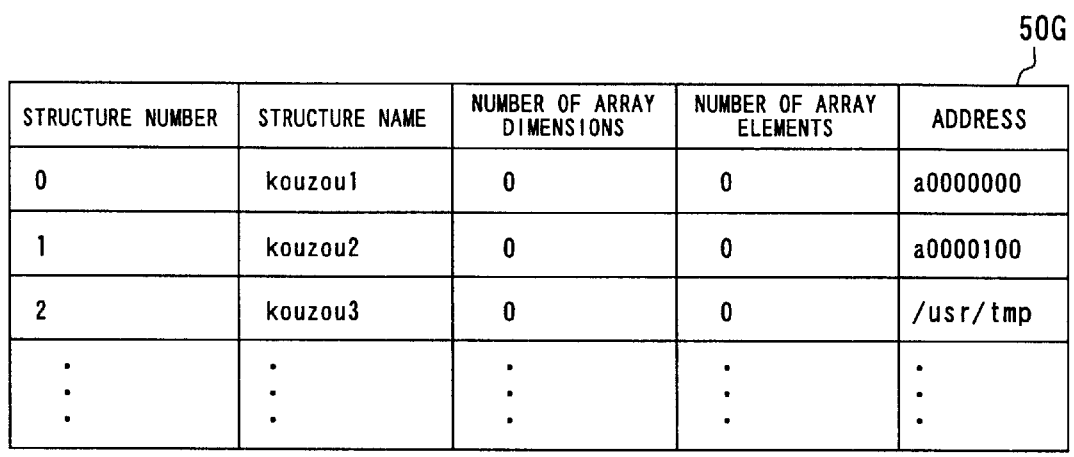
FIG. 25 is a diagram showing an example of a structure table according to the eighth embodiment.

A structure table 50G and a data table 14G produced by the data-table producing module 15G in accordance with the parameter management file 11G are shown in FIGS. 25 and 26, respectively.

As shown in FIG. 25, in the structure table 50G, the directory (/usr/tmp) to which the structure "kouzou3" belongs in the external memory 9 is stored as a substitute for the top address of the parameter in the structure units concerning the structure "kouzou3" stored in the external data storage unit 55.

As shown in FIG. 26, in the data table 14G, the directory in the external data storage unit 55 (the external memory 9) is stored as a substitute for the top address of each structural data concerning the structure "kouzou3".

Figure 27:
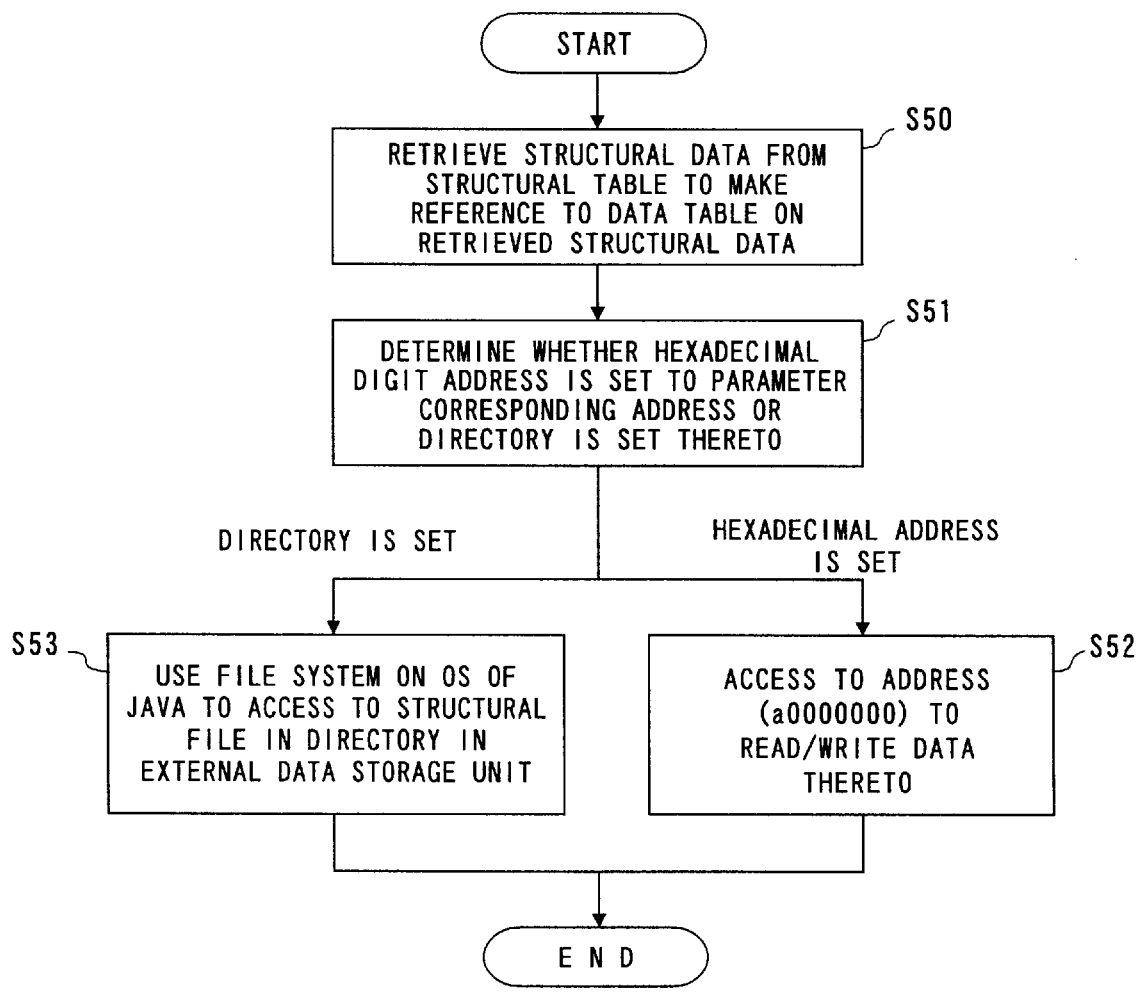
FIG. 27 is a schematic flow chart showing an example of process by an access process module according to the eighth embodiment.

The access process module 14G according to this embodiment, in accordance with the API, 18G, retrieves structural data from the structure table 50G so as to make a reference to the data table 14G in accordance with the retrieved structure data (Step S50 in FIG. 27), thereby determining whether a hexadecimal digit address is set to the temperature at the corresponding address or a directory is set thereto (Step 51).

If structural data is "structural data "max" of the structure name "kouzou1", the hexadecimal address (a0000000) is stored in the item corresponding to the address of the data "max". Therefore, the access process module 18G (API 17G) makes access to the address (a0000000) in the object data storage unit 10 in the internal memory 8. Thus, the access process module 18G (API 17G) reads/write data concerning the structural data "max" (Step S52).

On the other hand, in a case where structural data is "structural data "tmpdata1" of structure name "kouzou3", the director (/user/tmp) belonging in the external memory 9 is stored in the item corresponding to the address of the data "tmpdata1". Therefore, the access process module 18G (API 17G) uses a file system 56 on the OS of API description language (which is Java in this embodiment) installed on the data management unit 5a1.

Then, the access process module 18G (API 17G) makes access to the structure file belonging to the directory (/usr/tmp) in the external data storage unit 55 so as to read/write data concerning structural data "tempdata1" (Step S53).

As described above, according to this embodiment, when object data such as state data, control data and the like, are stored to be distributed in the internal memory, such as the SRAM, DRAM or the like and the external memory, such as the hard disk or the ROM, in a case of the object data stored in the internal memory, the address of the object data is set to the parameter management file.

On the other hand, in a case of the object data stored in the external memory, the directory of the object data is previously set to the parameter management file.

Therefore, it is possible to make access to the data (data file) in the external memory, such as the hard disk or the ROM, as well as the data in the internal memory.

As a result, it is possible to store the object data on any kind of data storage unit (memory) so as to increase the number of types of the storage units (the memories) to which access is permitted, making it possible to handle a large quantity of object data.

Ninth Embodiment

A control system 1H including a control computer in which a data management unit is incorporated (installed) according to a ninth embodiment of the present invention is structured similarly to the control system 1G shown in FIG. 23. Therefore, the structure of the control system 1H is omitted from illustration.

FIG. 28 shows a parameter management file 11H according to this embodiment.

The parameter management file 11H shown in FIG. 28 is structured such that "reading/writing permission/inhibition information", as the parameter in the structure units stored in the parameter management file 11G shown in FIG. 24, is stored in the parameter management file 11G so as to correspond to each parameter.

When "r" which represents read-only information is set as "reading/writing permission/inhibition information" in the parameter in the structure units of a certain structure, structural data constituting the structure is read-only data. That is, setting and updating of a data value to each address in the structural data corresponding to the information "r" from the terminal are inhibited.

On the other hand, when "w" which represents write-only information is set as "reading/writing permission/inhibition information", structural data constituting the structure is write-only data. Therefore, reading of data from each address in the structural data corresponding to the information "w" is inhibited.

When "rw" which represents reading/writing free information is set as "reading/writing permission/inhibition information", structural data constituting the structure is permitted to be read and written.

Since the "r" is set to a structure (the structure name "kouzou1") as the "reading/writing information", only reading and acquisition of each structural data constituting the structure (the structure name "kouzou1") are permitted from the terminal 4a1 through the access process module 18H.

Moreover, since the "rw" is set to each of the structure (structure name "kouzou2") and the structure (structure name "kouzou3") as the "reading/writing information", both of reading/acquisition and writing/setting of structural data constituting the structure (the structure name "kouzou2") and the structure (the structure name "kouzou3") are permitted from the terminal 4a1 through the access process module 18H.

A structure table 50H and a data table 14H produced by the data-table producing module 15H in accordance with the parameter management film 11H are shown in FIGS. 29 and 30, respectively.

As shown in FIG. 29, in the structure table 50H, as "reading/writing permission/inhibition information" "r", "rw" and "rw" are set as the parameters in the structure units concerning the structures "kouzou1", "kouzou2" and "kouzou3".

As shown in FIG. 30, in the data table 14H, "reading/writing permission/inhibition information" "r", "rw" and "rw" of the corresponding structures are set as "reading/writing permission/inhibition information" in the perimeters of structural data concerning the structures "kouzou1", "kouzou2" and "kouzou3".

Figure 31:
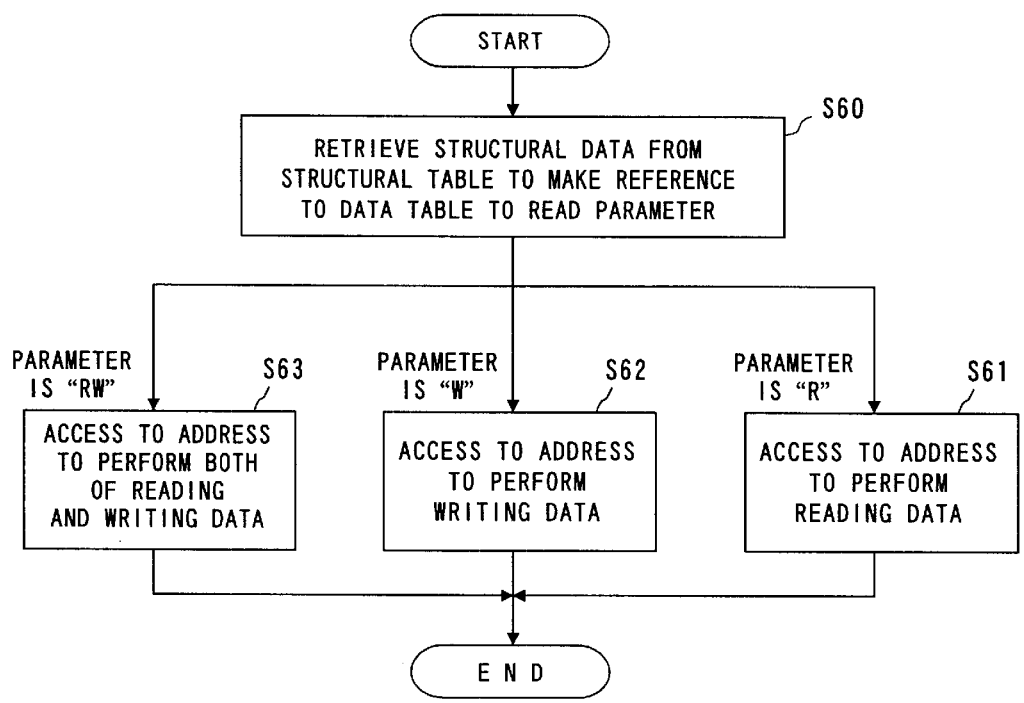
FIG. 31 is a schematic flow chart showing an example of process by an access process module according to the ninth embodiment.

The access process module 18H, in accordance with the API 17H, retrieves structural data from the structure table 50H. Next, according to the retrieved structure number, the access process module 18H makes a reference to the data table 14H to read the parameters (any one of "r", "w" and "rw") as the corresponding "reading/writing permission/inhibition information" (Step S60 in FIG. 31).

If the parameter of "reading/writing permission/inhibition information" is "r" (in a case of structural data "max" of the structure name "kouzou1"), the access process module 18H (the API 17H) makes access to the address (a0000000) in the object data storage unit 10 in the internal memory 8 so as to perform only reading/acquiring of data concerning structural data "max" (Step S61).

On the other hand, if the perimeter of "reading/writing permission/inhibition information" is "w", the access process module 18H (the API 17H) makes access to the address (a0000000) in the object data storage unit 10 in the internal memory 8 so as to perform only writing/setting of the data value concerning corresponding structural data (Step S62).

Furthermore, if the parameter of "reading/writing permission/inhibition information" is "rw" (in a case of structural data "default" of structural name "kouzou2"), the access process module 18H (the API 17H) makes access to the address (a0000100) in the object data storage unit 10 in the internal memory 8 so as to perform both of reading/acquiring of data concerning structural data "default" and writing/setting of the data value thereof (Step S63).

Figure 32:
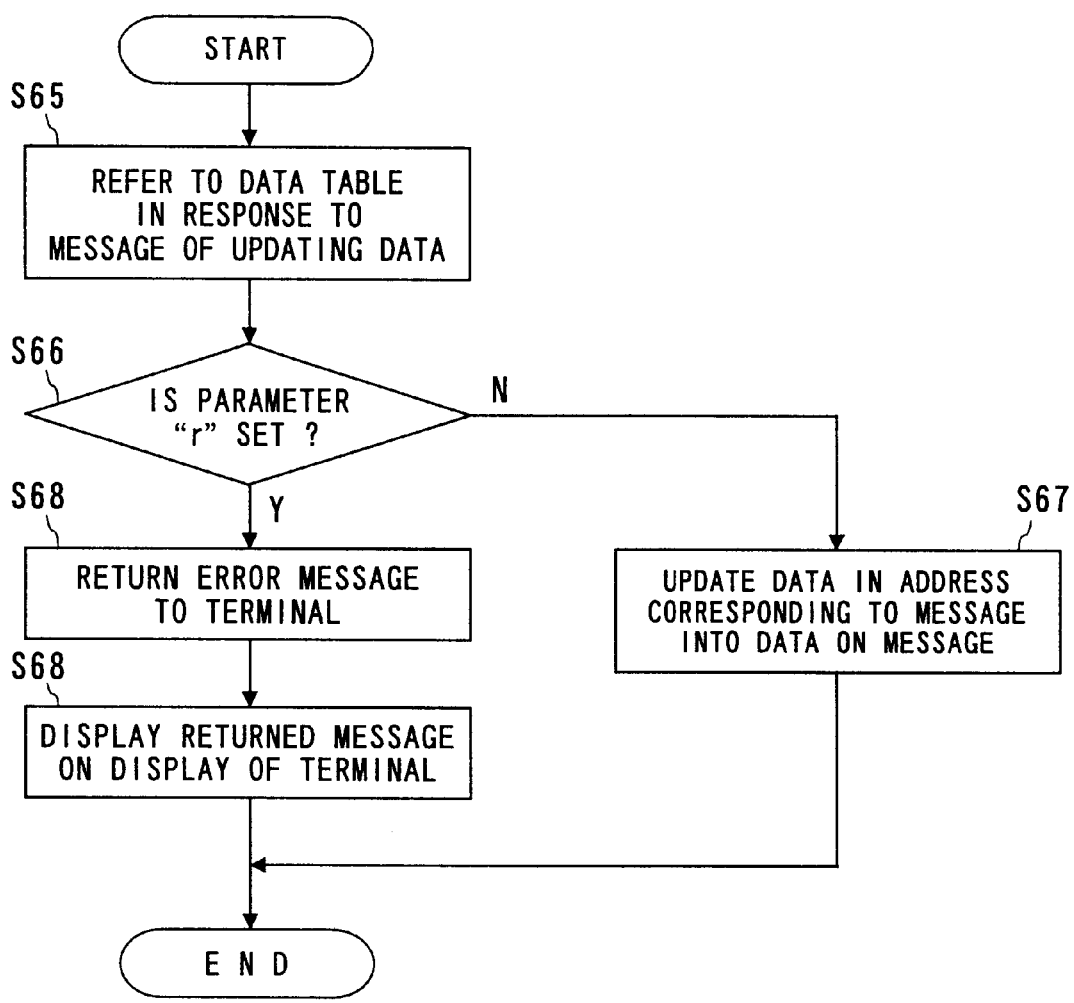
FIG. 32 is a schematic flow chart showing an example of processes by the access process module and a terminal according to the ninth embodiment.

When a message for setting (updating) data is transmitted from the terminal 4a1 and the access process module 18H is operated in accordance with the method (for example, M4) of the API 17H for setting a data value to make reference to the data table 14H (Step S65 in FIG. 32), in a case where the parameter of corresponding "reading/writing permission/inhibition information" is not "r" (the decision in Step S66 is NC), the access process module 18H (API 17H) updates the data in the address corresponding to the transmitted massage into the data corresponding to thereto (Step S67).

On the other hand, in a case where the parameter of corresponding "reading/writing permission/inhibition information" is "r" (the decision in Step S66 is YES), the access process module 18H (API 17H) returns, to the terminal 4a1, an error message (for example, −1 or "false") indicating the contents that setting/updating of the data value is inhibited (Step S68). The returned error message is displayed on the monitor screen by the process performed by the CPU 44 (Step S69). Therefore, the operator at the terminal who supervises the displayed error message is able to recognize that the operator transmits an error access command (message).

The foregoing error-message return process is performed similarly, for example, even in a case where a message for reading/acquiring the data value is transmitted in a state where the parameter of the corresponding "reading/writing permission/inhibition information" is "w" which permits only writing.

As described above, according to this embodiment, it is possible to set the "reading/writing permission/inhibition information" to each address of the object data storage unit, wherein the "reading/writing permission/inhibition information" includes that only writing/updating is permitted to the corresponding address, only reading/acquiring of object data is permitted to the corresponding address, or both of reading and writing are permitted to the corresponding address. Therefore, updating of object data, the updating of which is inhibited, cannot be performed from the terminal 4a1. Moreover, acquiring object data, the acquisition of which is inhibited, cannot be performed. As a result, it is possible to perform the operation of the data management unit satisfactorily safely.

Tenth Embodiment

Figure 33:
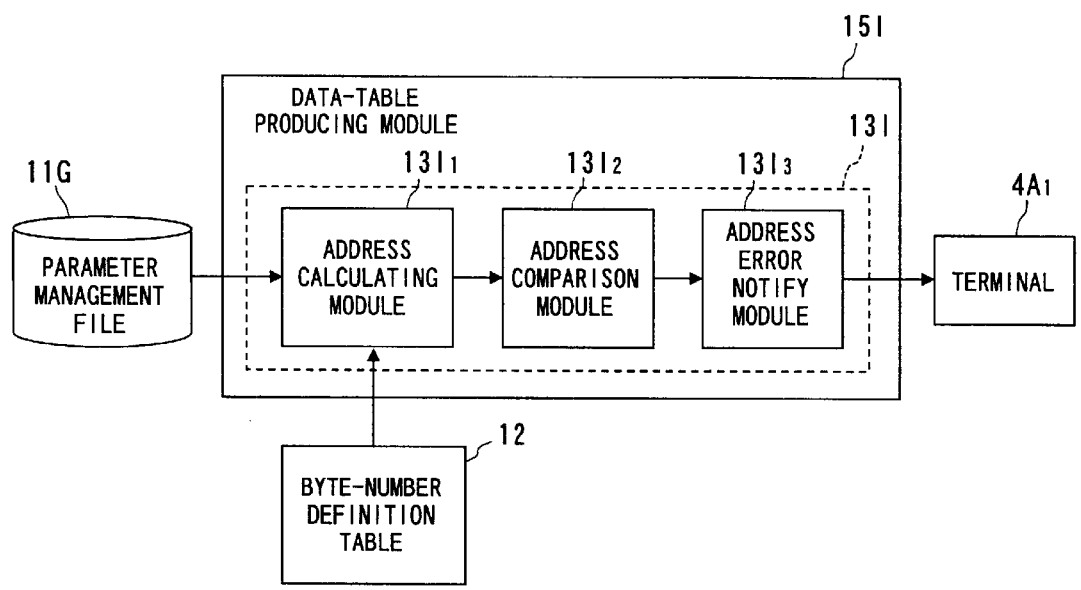
FIG. 33 is a block diagram showing only a data-table producing module, a parameter management file shown in FIG. 24, a byte-number definition table shown in FIG. 5 and a terminal of a data management unit of a control system according to a tenth embodiment of the present invention.

FIG. 33 is a block diagram showing only a data-table producing module 15I, a parameter management file 11G shown in FIG. 24, a byte-number definition table 12 shown in FIG. 5 and the terminal 4a1 of a data management unit 5a1 of a control system 1I according to a tenth embodiment of the present invention. Structures omitted from FIG. 33 are substantially similar to those of the control system 1E shown in FIG. 19. Therefore, similar structures of the control system 1I are omitted from illustration.

Referring to FIG. 33, the data-table producing program 13I incorporates an address calculating module (a program module) 13I1. The address calculating module 13I1 causes the data-table producing module 15I. When an operator who maintains the data management unit 5a1 updates the parameter management file 11G, to read, from the parameter management file 11G, the top address of each structure, the data type, the number of dimensions and the number of arrays of each structural data. Moreover, the address calculating module 13I1 causes the data-table producing module 15I to read the number of bytes of the corresponding data type from the byte-number definition table 12.

In accordance with the read top address of each structure, the data type, the number of dimensions of and the number of arrays of each structural data and the number of bytes of the corresponding data type, the address calculating module 13I1 causes the data-table producing module 15I to calculate the top address (refer to each address of each structural data shown in FIG. 26) of each structural data.

In addition, the data-table producing program 13I also incorporates an address comparison module (an address comparison program module) 13I2 for causing the data-table producing module 15I to compare the calculated addresses of structural data items so as to determine whether or not overlap takes place of the calculated addresses.

The data-table producing program 13I incorporates an address error notifying module (an address error notifying program module) 13I3 for causing the data-table producing module 15I, when the overlap occurs as a result of the comparison of the address comparison module 13I2, to transmit an address error message to the terminal 4a1 through the general-purpose network 3.

Then, an address overlap detection process of the data-table producing module 15I will now be described The top addresses stored in the parameter management file 11G are arranged in an ascending order. For example, in the parameter management file 11G shown in FIG. 24, structure "kouzou1" (a0000000) and structure "kouzou2" (a0000100) are arranged in sequence. Note that the end data in the structure "kouzou1" (a0000000) is dataX with the data type of "int".

Then, the data-table producing module 15I, in accordance with the address calculating portion 13I1, calculates the top address of each structural data by referring to each address of each structural data, as shown in FIG. 24. An assumption is made that the address of end data dataX of the structure "kouzou1" is "a0000120".

Next, the data-table producing module 15I, according to the address calculating portion 13I1, performs a process on the basis of the data structure (the number of bytes) of end data dataX of the structure "kouzou1" so as to obtain all of storage addresses "a0000120 to a0000123" of 4-byte data (dataX).

The data-table producing module 15I, on the basis of the address comparison module 13I2, compares the obtained end address "a0000123" and the obtained top address "a0000100" of the structure "kouzou2".

A fact can be understood that the address "a0000123" set for occupying dataX is larger than the top address "a0000100" obtained to occupy the structure "kouzou2".

When a fact that same addresses are overlapped between the adjacent structures (between "kouzou1" and "kouzou2") is recognized as a result of the comparison process, the data-table producing module 15I, in accordance with the address error notifying module 13I3, issues a message, for example, "the addresses of "kouzou1" and "kouzou2" overlap so as to modify the parameter management file 11G", to the terminal 4a1 of a person who maintains the data management unit 5a1. The person who maintains the data management unit 5a1 and who supervises the message on the monitor screen of the terminal 4a1 modifies the address of corresponding structural data of the parameter management file 11G.

In addition, the data-table producing module 15I is able to, in accordance with an address error notifying module 13I3' different from the address error notifying module 13I3 to calculate the overlap addresses thereby issuing a message including the overlapped address.

The forgoing case can be expressed as follows:

a0000123−a0000100+1=24 (hexadecimal digit)=36 (bytes)

Therefore, the data-table producing module 15I is able to transmit a message that "addresses of kouzou1 and kouzou2 by 36 bytes so as to modify parameter management file" to the terminal 4a1 of the person who maintains the data management unit.

In the foregoing case, the person for performing maintenance supervises the transmitted message on the monitor screen of the terminal 4a1 to easily recognize the quantity of shift of the address of the kouzou2. Therefore, it is possible to shorten time required to modify the parameter management file and to reduce labor required to complete the modifying operation.

When data in the form of a structure is not used as described in the first and second embodiments, the addresses occupied by object data items are calculated to sequentially compare whether or not overlap of the addresses occurs. As a result, overlap of the addresses can be prevented.

As described above, according to this embodiment, when addresses of object data items in the parameter management file produced by the person who maintains the data management unit overlap, a message indicating the overlap can be issued to the corresponding terminal to communicate this to the person who performs the maintenance. Therefore, the person who maintains the data management unit is able to reliably and easily recognize the error setting of the address to the parameter management file. As a result, it is possible to reliably prevent error setting of the address to object data.

Eleventh Embodiment

Figure 34:
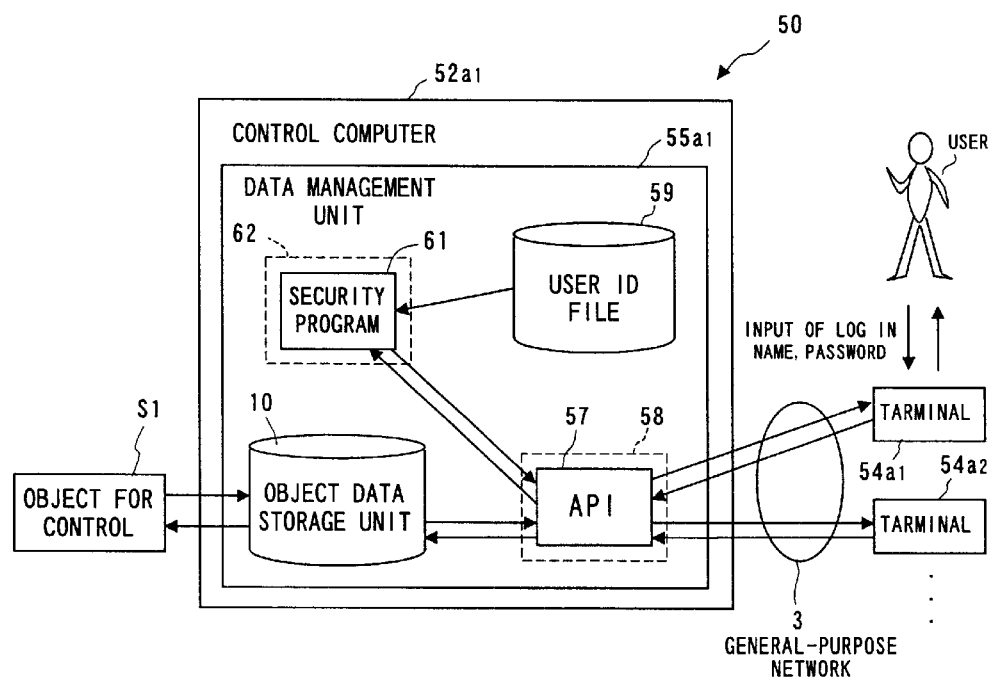
FIG. 34 is a block diagram showing the schematic structure of a control system 50 including a control computer in which a data management unit is incorporated according to an eleventh embodiment of the present invention.

FIG. 34 is a block diagram showing the schematic structure of a control system 50 including a control computer in which a data management unit is incorporated according to an eleventh embodiment of the present invention. Incidentally, structurally elements in FIG. 34, which are the same elements in FIG. 1 according to the first embodiment, are given to the same numerals of the corresponding structural elements in FIG. 1 so that the same structural elements are omitted from description or described simply.

Referring to FIG. 34, the control system 50 comprises a control computer 52a1 provided to correspond to the object unit S1; and terminals 54a1, 54a2, . . . , (two terminals in FIG. 34) connected to the control computer 52a1 through the general-purpose (public) network 3, such as Internet, telecommunication circuit, wide area network, and so on so as to enable data communication.

The control computer 52a1 of the control system 50 provided to correspond to the object S1 incorporates a data management unit 55a1 for managing state data obtained from the corresponding object S1 and control data therefor.

In FIG. 34, attention is directed to one control computer 52a1 so that an object S2 and a control computer 52a2 for supervising and controlling the object S2 are omitted from illustration.

The control computer 52a1 according to this embodiment has the same hardware structure as that of the control computer 2a1 shown in FIG. 3. The data management unit 55a1 installed in the control computer 52a1 uses the hardware components (the CPU 7, the internal memory 8 and the external memory 9) of the control computer 52a1 to manage data in the control computer 52a1.

The data management unit 55a1, as shown in FIG. 34, similarly to the control computer 2a1 according to the first embodiment and shown in FIGS. 2 and 3, incorporates the object data storage unit 10, the parameter management file 11, the byte-number definition table 12, the data-table producing program 13 and the data-table producing module 15. Note that the parameter management file 11, the byte-number definition table 12, the data-table producing program 13 and the data-table producing module 15 each having the same structure as that according to the first embodiment are omitted in FIG. 34.

The data management unit 55a1 is also provided with an API 57 and an access process module 58. The API 57 causes the access process module 58 to, in accordance with control information (access information) transmitted from each of the terminals 54a1, 54a2, . . . , make access to the object data storage unit 10. The API 28 comprises for example, at least one method indicating the data access rules (the functions, procedures) according to the contents of data accesses to the object data storage unit 10.

Furthermore, the data management unit 55a1 incorporates a user ID file 59 in which a user identification information (a user ID) in class units of the program of the API 58, which represents a user which is permitted to use the API 58 is stored to be registered.

Moreover, the data management unit 55a1 incorporates a security program 61 stored for example, on the external memory 9 and a security maintaining module 62 for determining whether or not the user corresponding to the user ID inputted from each of the terminals 54a1, 54a2, . . . , is permitted to use the API 57 so as to maintain the security of the data management unit 55a1 on the basis of the use of the API 57.

That is, the API 57, when a message (name of object data) for obtaining data (including the user ID) or a message (name of object data and the value of control data) for setting the value of data including the user ID is transmitted from the terminal 54a1, boots the security program 61 so as to operate the security maintaining module 62.

In addition, the API 57, according to the result of the operation of the security maintaining portion 62, causes the access process module 58 to execute an access process (a data obtaining process or a data setting process) to the object data storage unit 10, wherein the access process is equivalent to the access process module 18 in accordance with the API 17.

Figures 35, 36:
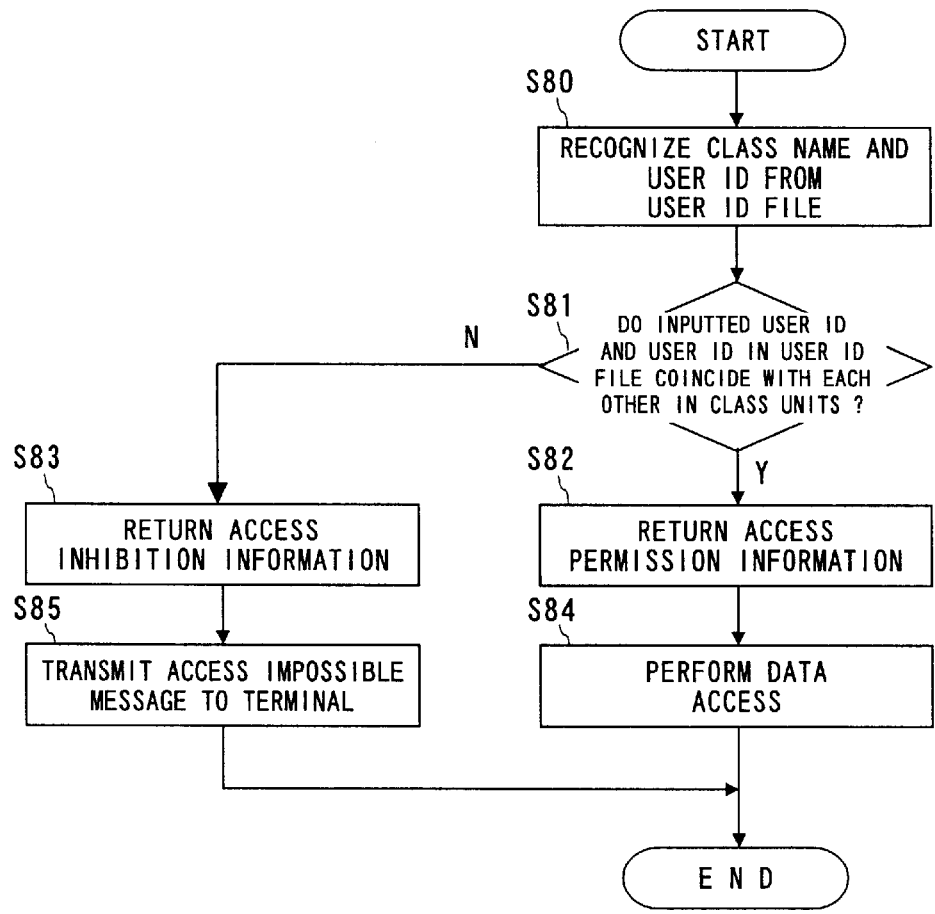
FIG. 35 is a diagram showing an example of a user ID file according to the eleventh embodiment.
FIG. 36 is a schematic flow chart showing an example of processes by a security maintaining module and an access process module according to the eleventh embodiment.

FIG. 35 shows an example of the user ID file 59.

As shown in FIG. 35, "dm=RelayReference" on the first line indicates the description for a user ID which is permitted to use the class of a program described in a Java language and having name of RelayReference including a relay setting (Relay Reference) function in a data management unit (data management=dm).

Description "usr="suzuki" on the second line is description of the user ID. That is, when the user ID suzuki is inputted by a user to all of methods in a class RelayReference of the API 58, the user inputting the user ID of suzuki is able to access, in accordance with the methods, to object data stored in the object data storage unit 10 of the data management unit 55a1.

On the other hand, the terminal 54a1 incorporates the CPU 44, the memory 45, the monitor 46 and the input device 47 similarly to the terminal 4a1 shown in FIG. 3.

The overall operation of this embodiment will now be described such that the security checking operation of the security maintaining module 62 is focused.

Similarly to the first embodiment, the operator {the operator (the user) of the terminal 4a1} for supervising and controlling the object S1 operates the input device 47 of the terminal 4a1 to input log-in name and the password to boot the terminal 4a1 (the booting program (software) of the terminal 4a1). Then, the operator operates the input device 47 to input data obtaining message or a data-value setting message corresponding to a predetermined method in the class of, for example, RelayReference.

At this time, in this embodiment, the user inputs, as the data obtaining message, the user ID (for example, user ID "suzuki") in addition to the name of object data which is desirable to supervise and control.

Moreover, the user inputs, as the data-value setting message, the name of object data that the user desires to set, the value of the data to be set and the user ID of the user. The input message is transmitted to the data management unit 55a1 of the control computer 52a1 through the general-purpose network 3 by the communication process performed by the CPU 44.

At this time, the access process module 18 of the data management unit 5a1 boots the security program 61 in the security maintaining module 62 in accordance with the user ID of the transmitted message.

In accordance with the booted security program 61, the security maintaining module 62 and the access process module 58 perform a process shown in FIG. 36.

That is, the security maintaining module 62 decomposes and reads the user ID file 59 to recognize the name of the class (RelayReference) and the user ID (suzuki)(Step S80). Then, the security maintaining module 62 determines whether or not the user ID ("suzuki") of the input message and the user ID of the recognized user ID file 59 coincide with each other in the class units of the API (Step S81).

At this time, because the message including the user ID ("suzuki") is a message for obtaining data corresponding to a predetermined method in the class of RelayReference or a message for setting the value of data corresponding thereto, and "usr="suzuki"" is set to the user ID file 59 in the class "RelayReference", an affirmative determination is made in step S81 (YES in step S81), that is, a determination is made that the user having the foregoing user ID "suzuki" is permitted to make access to the object data storage unit 10.

Therefore, the security maintaining module 62 returns a value "true" indicating "permission of access" to the access process module 58 (the API 57)(Step S82).

If the user ID in the message and the user ID in the user ID file 59 do not coincide with each other in class units (NO in step S81), the security maintaining module 62 returns a value "false" indicating "inhibition of access" to the access process module 58 (the API 57)(Step S83).

In accordance with the "access permission/inhibition information" returned from the security maintaining module 82, the API 57 is booted so as to boot the access process module 58.

When access permission information is transmitted, the access process module 58, similar to the first embodiment, performs a data access process (the data obtaining/data-value setting process) to the object data storage unit 10 in accordance with the method corresponding to the data obtaining message or the data-value setting message (Step S84), thereby returning a result of the process to the terminal 54a1.

On the other hand, if access inhibition information is transmitted, the access process module 57 communicates an access inhibition message indicating "access to object data described in the message is impossible because the user ID is incorrect" to the terminal 54a1 (Step S85).

If the user is permitted to log in the terminal 54a1, the user cannot make access to object data in the data management unit 55a1 in a case where the user has no access authority to the API 57 of the data management unit 55a1.

That is, in this embodiment, the security program 61 and the user ID file 59 are provided in the data management unit 55a1 so that, in accordance with the security program 61, the security maintaining module 62 is operated to check security between the user ID file 59 and the input user ID.

Figure 37:
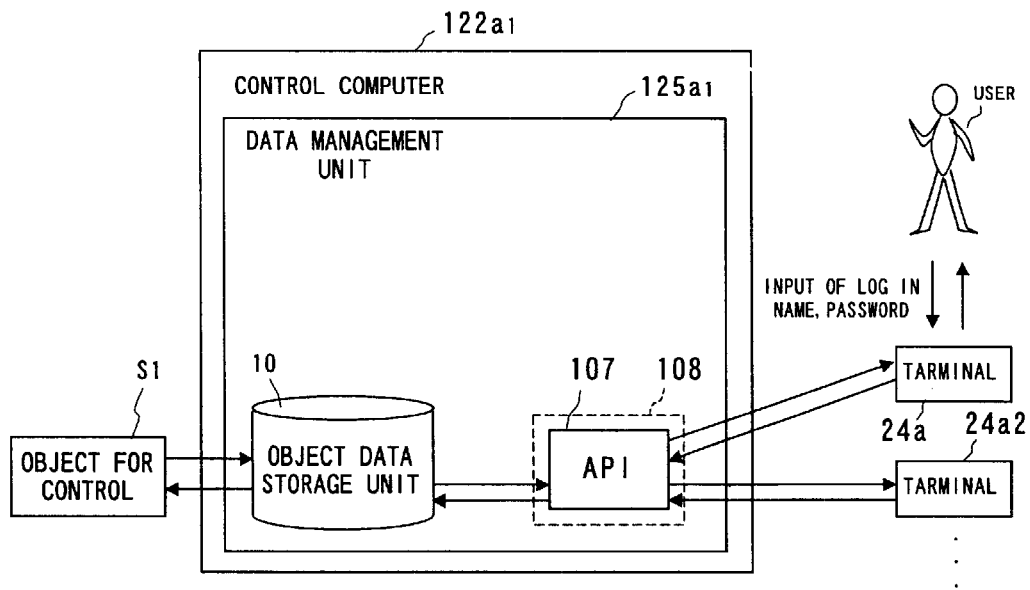
FIG. 37 is a diagram showing a control system including a control computer incorporating a data management unit which is not provided with a security program and a user ID file.

On the other hand, in the control system incorporating a control computer 122a1 including a data management unit 125a1 which is not provided with the security program 61 and the user ID file 59, as shown in FIG. 37, the foregoing system permits all of users who are permitted to use terminals (having log in names and passwords for the terminals) so as to make access (obtain object data and set the value of data) to all of data items of the object data storage unit. Therefore, security cannot easily be maintained for each user and each object data to which access is made.

However, in this embodiment, even though a user who has logged in the terminal, when the user has not data access authority to the API, the user do not perform data access (that is, obtaining and setting of data), making it possible to improve the security of the data management unit.

Twelfth Embodiment

Figure 38:
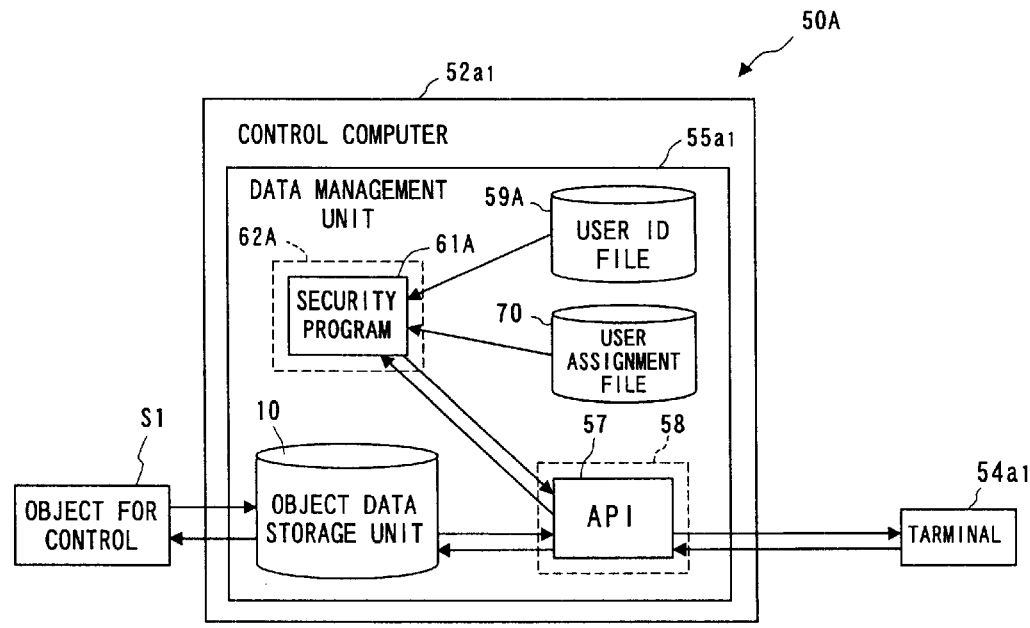
FIG. 38 is a block diagram showing a schematic structure of a control system including a control computer in which a data management unit is installed according to a twelfth embodiment of the present invention.

FIG. 38 is a block diagram showing the schematic structure of a control system 50A including a control computer in which a data management unit is installed according to a twelfth embodiment of the present invention. Similar elements to those of the control system 50 and the data management unit 55a1 shown in FIG. 38 are given the same reference numerals. The similar elements are omitted from description or described simply.

Referring to FIG. 38, the data management unit 55a1 incorporates a user assignment file 70 which is formed on the external memory 9 for storing an ID of a group to which users belong in method units of the program of the API 57.

FIG. 39 shows an example of a user ID file 59A according to this embodiment.

Referring to FIG. 39, the user ID file 59A contains a first line on which "dm=RelayReference" is described and a second line on which "group="DEP1-DEV1" is described so that a fact is indicated that a user in a group "DEP1-DEV1" is permitted to make access to the method in a class "RelayReference".

On the other hand, FIG. 40 shows an example of the user assignment file 70.

Referring to FIG. 40, the user assignment file 70 has a first line on which "dn:cn=DEP1-DIV1, ou=DEP1, ou=DIV1, o=toshiba, co.jp" are described so that a fact is indicated that group name "DEP1-DIV1" is the name of a group in "toshiba, co.jp" consisting of a group DEP1 and an upper hierarchical group DIV1 to the group DEP1.

Description "cn:DEP1-DIV1" on the second line indicates the group name on the first line. Description "uniquemember:uid=tanaka, ou=DEP1, ou=DIV1, o=toshiba, co.jp", "uniquemember:uid=suzuki, ou=DEP1, ou=DIV1, o=toshiba, co.jp" on the third and fourth lines indicates a fact that a user with the user ID (uid) "tanaka" a user with user ID "suzuki" belong to a group "DEP1". Moreover, a fact is indicated that the users with user IDs "tanaka" and "suzuki" belong to a group in "toshiba, co.jp" comprising an upper hierarchical group with respect to the group "DIV1".

That is, similarly to the eleventh embodiment, in this embodiment, the access process module 58 boots the security program 61A of the security maintaining module 62A in accordance with the user ID "tanaka" of the transmitted message from the terminal 54a1.

Figures 41, 42:
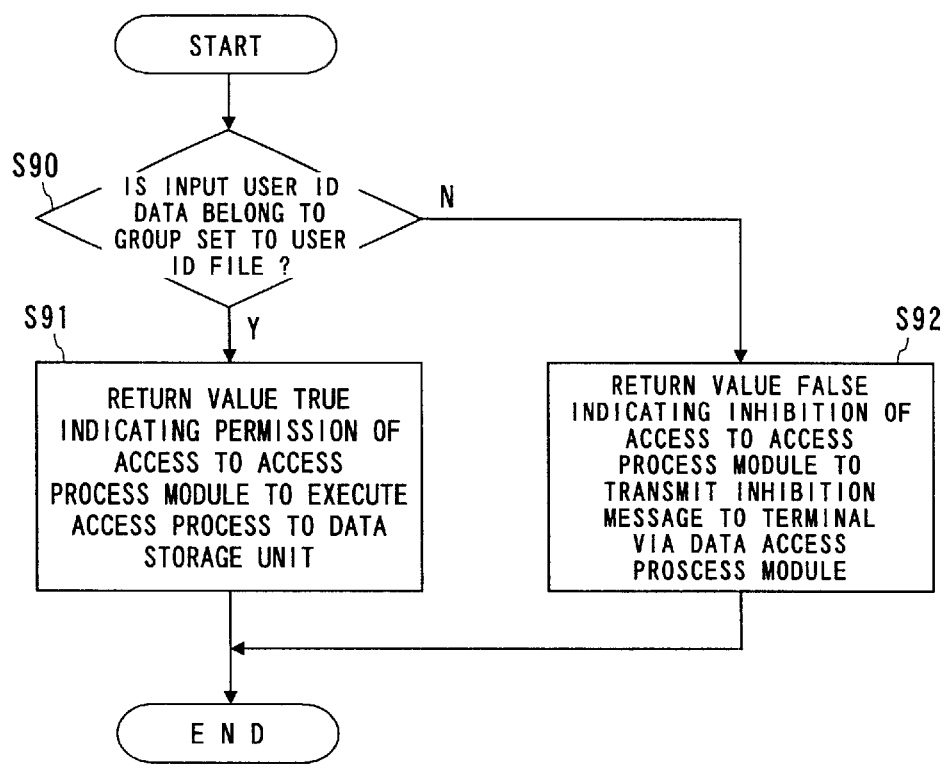
FIG. 41 is a schematic flow chart showing an example of process by a security maintaining module according to the twelfth embodiment.
FIG. 42 is a view showing a user ID file according to a fourteenth embodiment of the present invention.

In accordance with the security program 61A, the security maintaining module 62A makes a reference to the user assignment file 70 to determine whether or not the input user ID (for example, "tanaka") belongs to the group (for example, "DEP1-DIV1") set to the user ID file 59A (Step S90 in FIG. 41).

If the user ID belongs to the group as a result of the determination in Step S90, that is, the determination in Step S90 is YES (for example, a fact can be understood that "tanaka" belongs to "DEP1-DIV1" from the third line of the user assignment file 70, the security maintaining module 62A returns the value "true" indicating "permission of access" to the access process module 58 (API 57) so as to cause the access process module 58 (API 57) to execute the above access process to the object data storage unit 10. (Step S91).

If the user ID does not belong to the group as a result of the foregoing determination in Step S90, that is the determination in Step S90 is NO, the security maintaining module 62A returns a value "false" indicating "inhibition of access" to the access process module 58 (the API 57). Thus, the security maintaining module 62A performs a process for transmitting an access inhibition message through the access process module 57 (the API 58) to the terminal 54a1 which transmits the message (Step S92).

Incidentally, a modification may be employed in which either of the lower hierarchical group "DEP1" or the upper hierarchical group "DIV1" is stored in the user ID file. Thus, a user belonging to an upper hierarchical group or a lower hierarchical group is permitted to use the API 57. Hence it follows that registration of the data access authority in group units in a hierarchical structure can be performed.

As described above, according to this embodiment, the data management unit includes the security program 61A, the user ID file 59A and the user assignment file 70. In accordance with the security program 61A, the security maintaining module 62A is operated. Thus, security check can be performed between the user ID file 59A and the user assignment file 70 and the input user ID.

As a result, it is possible to execute, when access is made from an external terminal to object data in the data management unit, the security check in group units of the user. A user who has logged in the terminal and belongs to a group having no data access authority cannot set or obtain data, making it possible to improve the security performance of the data management unit.

Thirteenth Embodiment

The schematic structure of a control system 50B including a control computer in which a data management unit is incorporated according to a thirteenth embodiment of the present invention is similar to that of the control system 50A and the data management unit 55a1 shown in FIG. 38. Therefore, similar elements are omitted from illustration.

According to this embodiment, the security maintaining portion 62B periodically reads the user ID file 59A and the user assignment file 70 in accordance with the security program 61B.

The security program 61B for periodically reading the file is realized in the Java language as follows:

```
While (true){
try{
  File f1=new File ("usr_ID_file");
  File f2=new File ("usr_syozoku_file");
(hereinafter a file reading process, decoding and decomposition processes of character strings of a file and recognition process of user ID and group are performed)
  .
  .
  .
  sleep (3600000;
}catch(Exception e){}
}
```

Reading of the file can be performed in a sleep (sleep method) (3600000) at intervals of one hours.

As described above, in this embodiment, the data management unit includes the security program 61B, the user ID file 29A and the user assignment file 70. In accordance with the security program 61B, the security maintaining module 62B is operated so as to periodically read the user ID file 59A and the user assignment file 70 at predetermined periods. Thus, when the assignment of the user is changed, the class of the API which can be used by the user is changed, or a user who is permitted to use the API is added or deleted, the contents of the change is reliably and periodically reflected on internal data of the security program. Therefore, the security performance of the data management unit can furthermore be improved.

Fourteenth Embodiment

The schematic structure of a control system 50C including a control computer in which a data management unit is incorporated according to a fourteenth embodiment is similar to the elements of the control system 50A and the data management unit 55a1 shown in FIG. 38. Therefore, similar elements are omitted from illustration.

A user ID file 59C according to this embodiment, as shown in FIG. 42, is arranged such that the user ID is stored to be registered in method units of the program of the API 57.

Referring to FIG. 42, "dm=RelayReference.getValue" on the first line indicates a method "getValue" in the class "RelayReference". Description "DEP1-DIV1" on the second line indicates a group to which a user which is permitted to use the method belongs.

The security maintaining modules 62C, in accordance with the security program 61C, reads a character string on the first line. Thus, the security maintaining module 62C recognizes the class and the method of the API 57 for security. The other operations are similar to those according to the twelfth embodiment.

That is, in this embodiment, the data management unit includes the security program 61C, the user ID file 59C and the user assignment file 70. Moreover, the class and the method of the program of the API for security are set to the user ID file 59C. In accordance with the security program 61C, the security maintaining module 62C is operated to read the user ID file 59C. Thus, a user which is permitted to use the method can be specified for each method. Therefore, management of a user at each data access in which the method is realized can be performed. Hence it follows that the security management of the data management unit in data access units can be realized.

Fifteenth Embodiment

Figure 43:
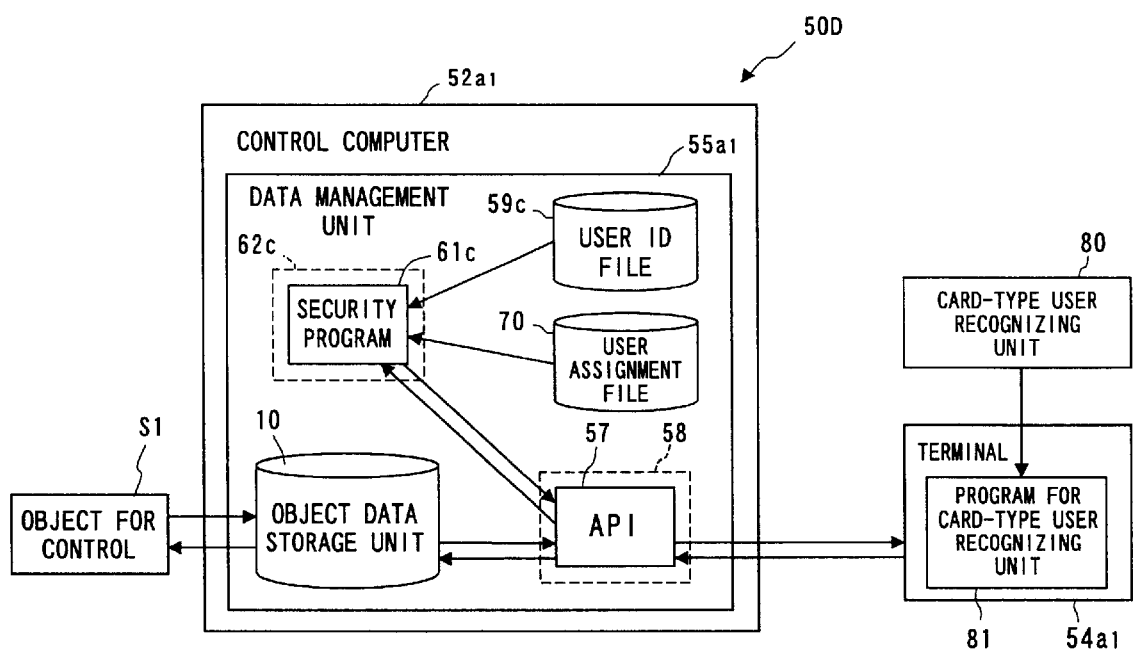
FIG. 43 is a block diagram showing a control system including a control computer in which a data management unit is installed according to a fifteenth embodiment of the present invention.

FIG. 43 is a block diagram showing a control system 50D including a control computer in which a data management unit is installed according to a fifteenth embodiment of the present invention. Elements similar to those of the control system 50C according to the fourteenth embodiment are given the same reference numerals. The similar elements are omitted from description or described simply.

In this embodiment, a card-type user recognizing unit 80 is connected to the CPU 44 of the terminal 54a1. A program 81 for the card-type user recognizing unit 80 is installed on the memory 45 of the control computer 54a1.

The card-type user recognizing unit 80 is a unit for reading the name of the user and the password thereof stored on an IC card set to the reading portion of the unit 80, which is carried by an operator (a user) of the terminal 54a1, wherein the password is specific to the user name. The card-type user recognizing unit 80 transfers the read contents to the CPU 44 of the terminal 54a1.

Figure 44:
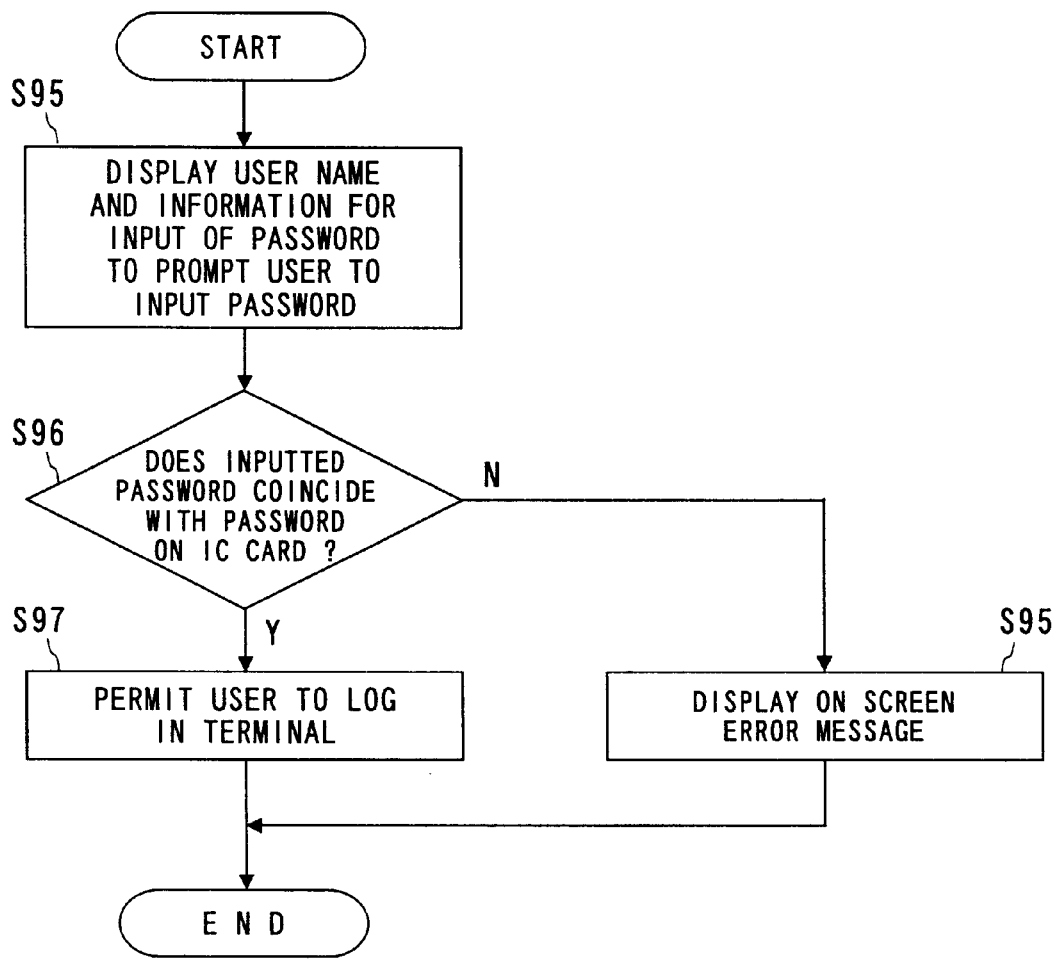
FIG. 44 is a schematic flow chart showing an example of process by a terminal according to the fifteenth embodiment.
Figure 45:
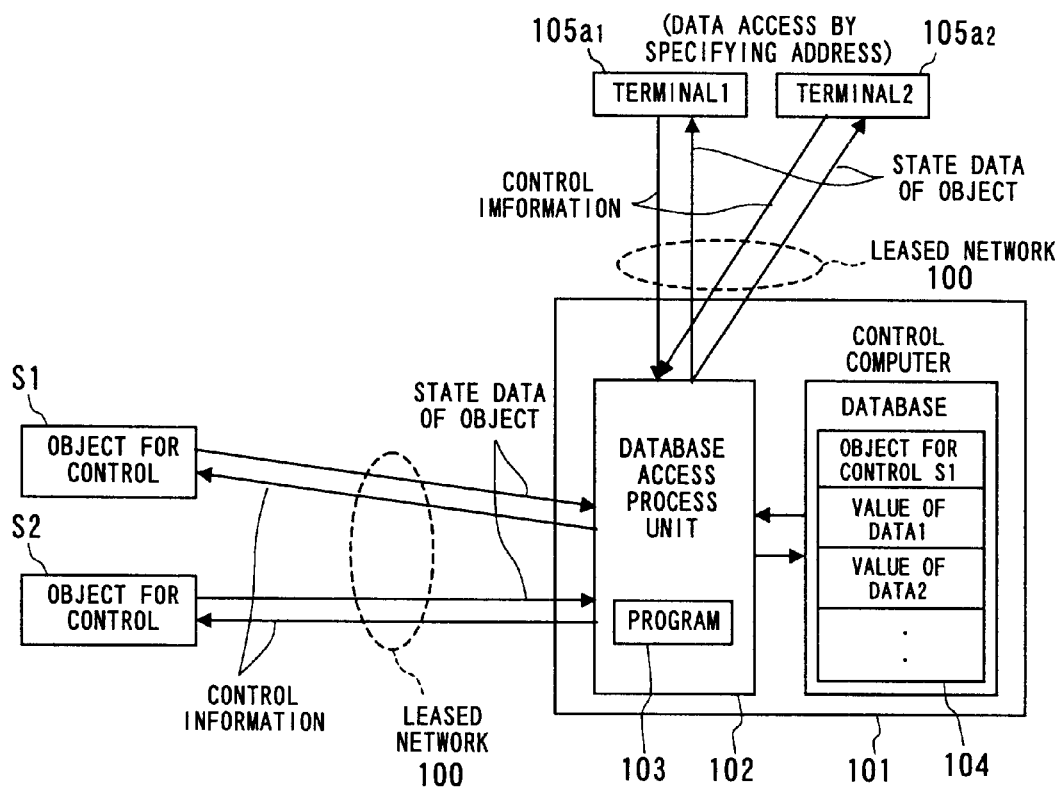
FIG. 45 is a view showing a schematic structure of a conventional supervisory control system for supervising and controlling a plurality of equipment devices.

The CPU 44 of the terminal 54a1 is operated in accordance with the program 81 so as to display transferred information about the user name and information related to an input of the password information on the screen of the monitor 46 to prompt the user to input password (Step S95 in FIG. 44).

When the user operates the input device 47 to input the password on the screen of the monitor 46, the CPU 44 determines whether or not the password inputted from the user coincides with the password on the IC card (Step S96).

If the two passwords do not coincide with each other (determination in Step S96 is NO), the CPU 44 displays on the screen of the monitor 46 the error message of, for example, "the inputted password is wrong" (Step S97).

On the other hand, the two passwords coincide with each other (determination in Step S96 is YES), the CPU 44 of the terminal 54a1 permits the user to log in the terminal 54a1 (Step S98). As a result, introduction into the screen for calling the API 57 of the data management unit 55a1 of the computer 52a1 is permitted from the remote terminal 54a1 with respect to the computer 52a1.

As described above, according to this embodiment, because only an authorized user who has a predetermined IC card and knows the password of the IC card is permitted to use the terminal 54a1, it is possible to perform, in addition to the security function of the data management unit, double security check, thus improving the overall security of the control system.

Each of the foregoing embodiments is structured such that data access is performed to one data management unit of one control computer from one terminal. Note that the present invention is not limited to the foregoing structure. A structure may be employed in which data accesses are performed to respective data management unites of control computers from terminals.

In each of the foregoing embodiments, the data management unit is provided for the control computer for controlling the object for control. The present invention is not limited to the foregoing structure. The data management unit according to the present invention may be provided for a computer in a computer system in which access is made to data stored in a database of the computer from a terminal.

Furthermore, in the present invention, the control system of each embodiment may be applied to a control system for supervising or controlling a plurality of objects (equipment devices) concerning electric power, gas, water service or other plants.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. A data management unit in a computer system, the computer system having a computer in which the data management unit is incorporated, and a terminal intercommunicating with the computer, said data management unit comprising:

first storage means having a memory for storing, in addresses on the memory, data items to which the terminal is adapted to make access;

second storage means for storing thereon parameters concerning a data structure of each data item, said parameters including a data name of each data item, a data type of each data item, an address related to each data item on the memory and an array information of at least one data item, said at least one data item having an array structure, said array information including a number of the array elements;

third storage means for storing thereon a number of bytes corresponding to each data type of each data item; and producing means for making, according to the parameters concerning the data structures of the data items and the numbers of bytes of the data types, an address related to each data item in array element units on the memory correspond to each data name of each data item so as to produce a data table.

2. A data management unit according to claim 1, wherein said address related to each data item in array element units and stored in the data table is a top address of each data item in array element units on the memory.

3. A data management unit according to claim 2, wherein said producing means comprises:

means for reading each top address related to each data item on the memory, each data type thereof and the array information of the at least one of the data items from the second storage means, respectively;

means for reading each number of bytes corresponding to each data type from the third storage means;

means for calculating each top address related to each data item for each array element according to each address, each data type, the array information and each number of bytes, which are read from the second and third storage means; and means for making each top address related to each data item in array element units correspond to each data name of each data item so as to produce the data table.

4. A data management unit according to claim 1, further comprising obtaining means for retrieving the data table according to a data name transmitted from the terminal so as to obtain at least one address corresponding to the transmitted data name, thereby returning at least one data item stored in the at least one address on the memory to the terminal.

5. A data management unit according to claim 4, further comprising writing means for retrieving the data table in accordance with a data name and a data value corresponding thereto so as to obtain at least one address corresponding to the data name, thereby writing the data value into the at least one obtained address on the memory, said data name and data value being transmitted from the terminal.

6. A data management unit according to claim 1, wherein said data items include a structure having structural data elements, said second storage means stores thereon structure parameters concerning the data structure of each structural data element of the structure, said structure parameters including a data name of each structural data element, a data type of each structural data element, an address related to each structural data element on the memory and an array information or at least one of the structural data elements, said array information including a number of array elements; and wherein said producing means includes means for making, according to the structural parameters concerning the data structures of the data items and the numbers of bytes of the data types, an address related to each structural data element in array element units on the memory correspond to each data name of each structural data element so as to produce the data table.

7. A data management unit according to claim 6, wherein said structure consists of structures each having structural data elements, said second storage means stores thereon a top address of each structure as an address related to each data item on the memory, and wherein said producing means is adapted to obtain each address of each structural data element of each structure in array element units according to each top address of each structure, each number of bytes of each structural data element and the array information so as to make each obtained address of each structural data element in array element units correspond to each name of each structural data element so as to produce the data table.

8. A data management unit according to claim 1, wherein said computer comprises a main memory and an auxiliary memory, said producing means is adapted to produce the data table on the main memory, and further comprising:

means for storing the data table produced on the main memory on the auxiliary memory; and means, when the computer is booted, adapted to load the data table stored on the auxiliary memory into the main memory.

9. A data management unit according to claim 8, further comprising means, when the computer is booted, for selecting whether the producing means produces a new data table in accordance with the parameters stored on the second storage means or the loading means loads the data table stored on the auxiliary memory into the main memory.

10. A data management unit according to claim 6, wherein said structure consists of structures each having structural data elements, said second storage means stores thereon a top address of each structure as an address related to each data item on the memory, and wherein said producing means comprises means adapted to obtain each offset value of each structural data element of each structure according to each top address of each structure, each number of bytes of each structural data element and the array information, said each offset value of each structural data element representing each distance between each top address of each structure and each structural data element; and means adapted to make each obtained offset value of each structural data element correspond to each name of each structural data element so as to produce the data table.

11. A data management unit according to claim 1, wherein said computer comprises an auxiliary memory, said first storage means comprises means for storing, in addresses on the memory, one part of the data items and for storing another part thereof in directories in the auxiliary memory, said second storage means stores the directories in which the another part of the data items are stored in place of the addresses related to another part of the data items, and wherein said producing means is adapted to make, according to the parameters including the directories and concerning the data structures of the data items and the numbers of bytes of the data types, addresses or one part of the data items and directories of another part thereof in array element units correspond to the data names of the data items, respectively, so as to produce the data table.

12. A data management unit according to claim 5, wherein said parameters further include limitation information of each data item for limiting a content of access to each data item, said producing means makes each address of each data item in array element units correspond to each data name of each data item and each limitation information thereof so as to produce the data table, and said obtaining means comprises means for retrieving the data table according to a data name transmitted from the terminal so as to obtain at least one address and the limitation information corresponding to the transmitted data name, and means for determining whether or not at least one data item stored in the at least one address on the memory is obtained according to the limitation information, and wherein said writing means comprises means for retrieving the data table in accordance with the data name and the data value corresponding thereto so as to obtain at least one address and the limitation information corresponding to the data name; and means for determining whether or not the data value is written into the at least one address on the memory according to the limitation information.

13. A data management unit according to claim 1, wherein said producing means further comprises:

means for reading each address related to each data item, each data type thereof and the array information of the at least one of the data items from the second storage means, respectively;

means for reading each number of bytes corresponding to each data type from the third storage means;

means for calculating each address of each data item in array element units according to each address, each data type, the array information and each number of bytes, which are read from the second and third storage means;

means for comparing each calculated address of each data item in array element units to each other so as to determine whether or not an overlap occurs between at least two calculated addresses; and means adapted to, when determination is made that the overlap occurs, transmit an address error message to the terminal.

14. A data management unit in a computer system, the computer system having a computer in which the data management unit is incorporated, and a terminal intercommunicating with the computer, said data management unit comprising:

first storage means having a memory for storing, in addresses on the memory, data items to which the terminal is adapted to make access;

second storage means for storing thereon parameters concerning a data structure of each data item, said parameters including a data name of each data item, a data type of each data item, an address related to each data item on the memory and an array information of at least one data item, said at least one data item having an array structure, said array information including a number of array elements;

third storage means for storing thereon a number of bytes corresponding to each data type of each data item; and producing means for making, according to the parameters concerning the data structures of the data items and the numbers of bytes of the data types, an address related to each data item in array element units on the memory correspond to each data name of each data item so as to produce a data table;

access means for retrieving the data table according to a message transmitted from the terminal so as to be capable of making access to the memory based on the retrieved result, said message including a user ID;

means for registering at least one user ID that at least one user has, said at least one user being permitted to make access to the data;

means for determining whether or not the at least one registered user ID in the registering means and the user ID from the terminal coincide with each other according to the transmitted message from the terminal, said user ID being included in the message transmitted therefrom; and means adapted to transmit an access permission command to the access means when the determining means determines that the at least one registered user ID and the transmitted user ID from the terminal coincide with each other, and when the determining means determines that the at least one registered user ID and the transmitted user ID do not coincide with each other, to transmit an access inhibition command to the access means, wherein said access means is adapted to make access to the memory only when the access permission command is transmitted to the access means.

15. A data management unit in a computer system, the computer system having a computer in which the data management unit is incorporated, and a terminal intercommunicating with the computer, said data management unit comprising:

first storage means having a memory for storing, in addresses on the memory, data items to which the terminal is adapted to make access;

second storage means for storing thereon parameters concerning a data structure of each data item, said parameters including a data name of each data item, a data type of each data item, an address related to each data item on the memory and an array information of at least one data item, said at least one data item having an array structure, said array information including a number of array elements;

third storage means for storing thereon a number of bytes corresponding to each data type of each data item;

producing means for making, according to the parameters concerning the data structures of the data items and the numbers of bytes of the data types, an address related to each data item in array element units on the memory correspond to each data name of each data item so as to produce a data table;

access means adapted to retrieve the data table according to a message transmitted from the terminal so as to be capable of making access to the memory based on the retrieved result, said message including a user ID;

means for registering user groups, said user groups being permitted to make access to the memory;

means for setting at least one user ID so as to belong to the at least one user group;

means for determining whether or not the user ID from the terminal belongs to at least one of the registered user groups according to a registered content of the registering means and a set content of the setting means, said user ID being included in the message transmitted from the terminal; and means adapted to transmit an access permission command to the access means when the determining means determines that the transmitted user ID belongs to the at least one of the registered user groups, and when the determining means determines that the transmitted user ID do not belong to the at least one of the registered user groups, to transmit an access inhibition command to the access means, wherein said access means is adapted to make access to the memory only when the access permission command is transmitted to the access means.

16. A data management unit according to claim 14, wherein said access means has a number of methods so that the access means retrieves the data table in accordance with at least one of the methods so as to be capable of making access to the memory according to the retrieved result, said at least one of the methods corresponding the message including the user ID and transmitted from the terminal, and said registering means is adapted to register the at least one user ID at each method.

17. A data management unit according to claim 15, wherein said determining means periodically reads the registered contents of the registering means and the set contents of the setting means so as to periodically determine whether or not the user ID from the terminal belongs to at least one of the registered user groups according to the results periodically read from the registering means and the setting means.

18. A data management unit according to claim 15, wherein said access means has a number of methods so that the access means retrieves the data table in accordance with at least one of the methods so as to be capable of making access to the memory according to the retrieved result, said at least one of the methods corresponding the message including the user ID and transmitted from the terminal, and said registering means is adapted to register the user groups at each method.

19. A computer system comprising:

a computer in which the data management unit according to claim 1 is incorporated;

a terminal intercommunicating with the computer;

a card that a user has, said card storing thereon a user name and a password of the user; and means for reading the user name and the password from the card so as to authenticate whether or not the user is permitted to use the terminal.

20. A computer-readable storage medium comprising:

data items to which a computer is adapted to make access;

a parameter file storing thereon parameters concerning a data structure of each data item, said parameters including a data name of each data item, a data type of each data item, an address related to each data item on the memory and an array information of at least one data item, said at least one data item having an array structure, said array information including a number of array elements;

a table storing thereon a number of bytes corresponding to each data type of each data item; and means for causing a computer to make, according to the parameters concerning the data structures of the data items and the numbers of bytes of the data types, an address related to each data item in array element units correspond to each data name of each data item so as to produce a data table.

* * * * *